(12) United States Patent
Qian et al.

(10) Patent No.: US 11,089,631 B2
(45) Date of Patent: Aug. 10, 2021

(54) APPARATUS AND METHOD FOR PERFORMING A RANDOM ACCESS

(71) Applicant: Samsung Electronics Co., Ltd., Suwon-si (KR)

(72) Inventors: Chen Qian, Beijing (CN); Bin Yu, Beijing (CN); Qi Xiong, Beijing (CN); Yingjie Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 16/483,956

(22) PCT Filed: Feb. 6, 2018

(86) PCT No.: PCT/KR2018/001546
§ 371 (c)(1),
(2) Date: Aug. 6, 2019

(87) PCT Pub. No.: WO2018/143762
PCT Pub. Date: Aug. 9, 2018

(65) Prior Publication Data
US 2020/0128587 A1 Apr. 23, 2020

(30) Foreign Application Priority Data

Feb. 6, 2017 (CN) .......................... 201710067369.8

(51) Int. Cl.
*H04W 74/08* (2009.01)
*H04W 8/24* (2009.01)
*H04W 56/00* (2009.01)
*H04W 72/04* (2009.01)

(52) U.S. Cl.
CPC ......... *H04W 74/0833* (2013.01); *H04W 8/24* (2013.01); *H04W 56/0045* (2013.01); *H04W 72/046* (2013.01)

(58) Field of Classification Search
CPC ............... H04W 74/0833; H04W 8/24; H04W 56/0045; H04W 72/046; H04W 72/042; H04W 88/00; H04L 1/08; H04L 1/0039; H04B 7/0617; H04B 7/088
See application file for complete search history.

(56) References Cited

U.S. PATENT DOCUMENTS

| 2015/0049712 | A1 | 2/2015 | Chen et al. | |
|---|---|---|---|---|
| 2016/0029358 | A1* | 1/2016 | Hou ................. | H04W 74/0833 370/329 |
| 2020/0059967 | A1* | 2/2020 | Kim ................. | H04W 74/0833 |

FOREIGN PATENT DOCUMENTS

WO   2016/053026 A1   4/2016

OTHER PUBLICATIONS

Samsung, "RACH resource for MSG1 transmission", R1-1612460, 3GPP TSG RAN WG1 #87, Reno, USA, Nov. 4, 2016, pp. 1-3.
Samsung, "RAR/Msg3/Msg4 transmission for low cost UEs", R1-152841, 3GPP TSG RAN WG1 #81, Fukuoka, Japan, May 15, 2015, pp. 1-3.

* cited by examiner

*Primary Examiner* — Dady Chery
(74) *Attorney, Agent, or Firm* — Jefferson IP Law, LLP

(57) ABSTRACT

The present disclosure provide a method for performing a random access by a user equipment (UE), the method including; receiving a random access response (RAR); transmitting at least one Msg3 corresponding to a beam reciprocity capability of the UE.

18 Claims, 15 Drawing Sheets

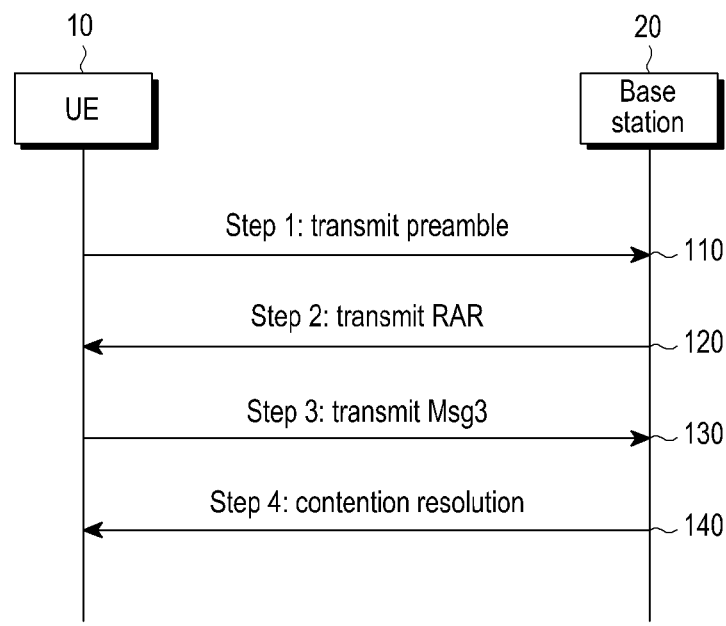
[Fig. 1]

[Fig. 2]
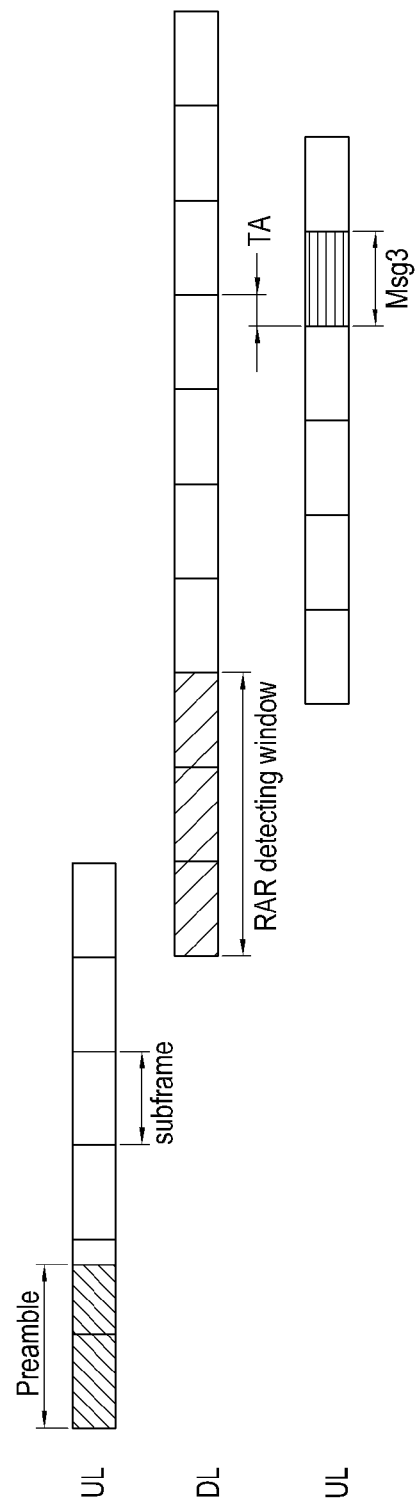

[Fig. 3]
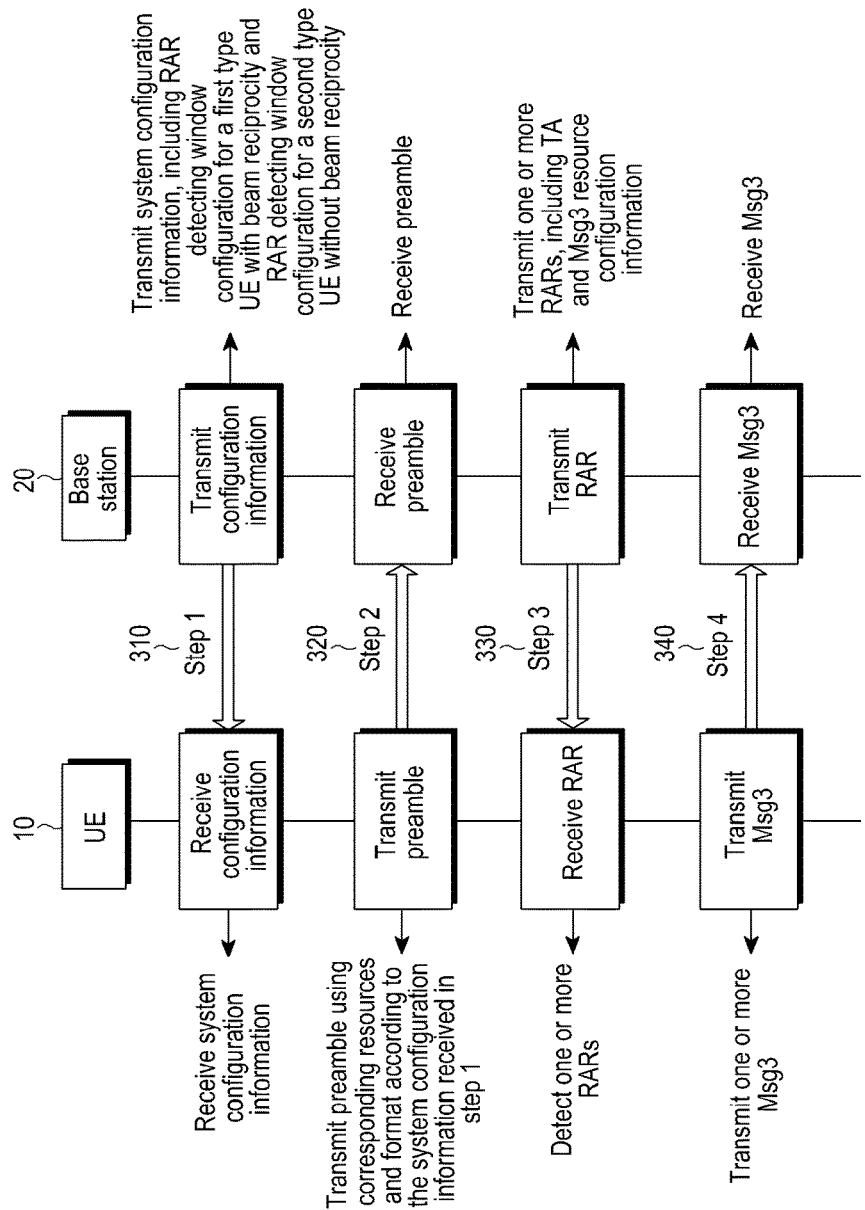
[Fig. 4]
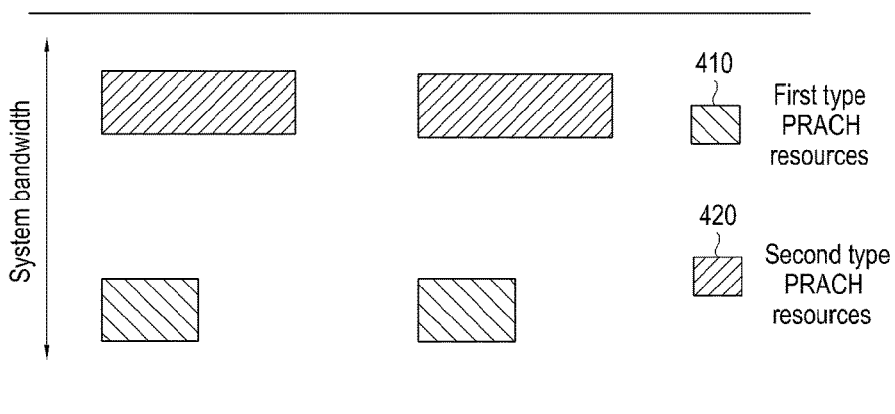

[Fig. 5]
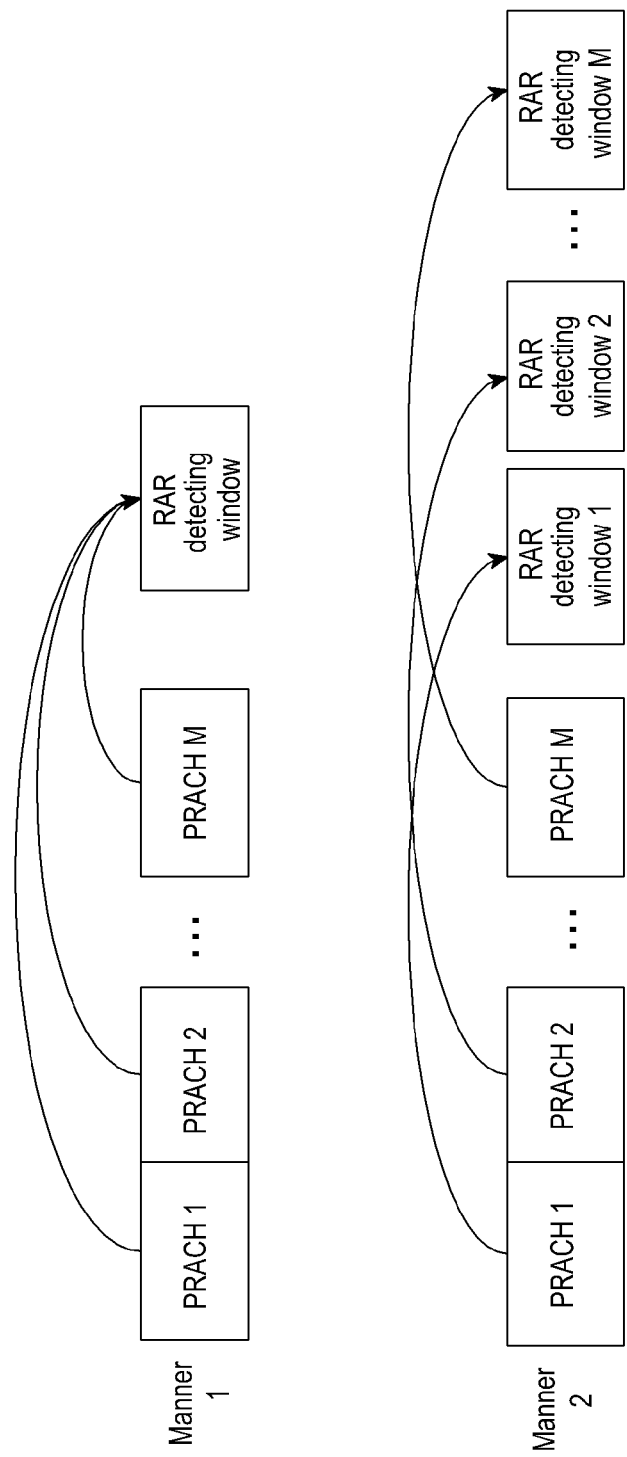

[Fig. 6]
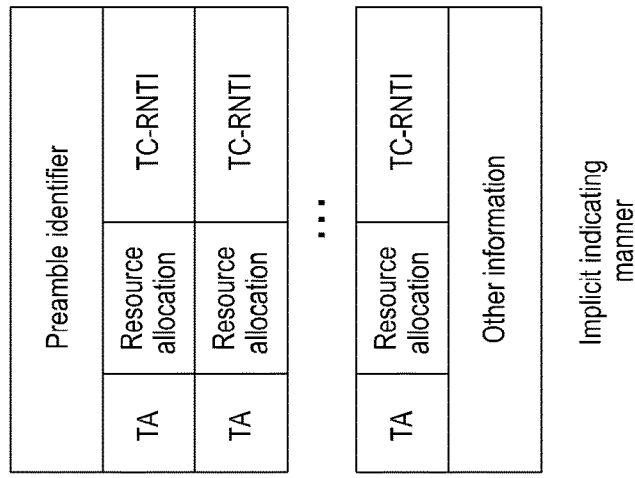
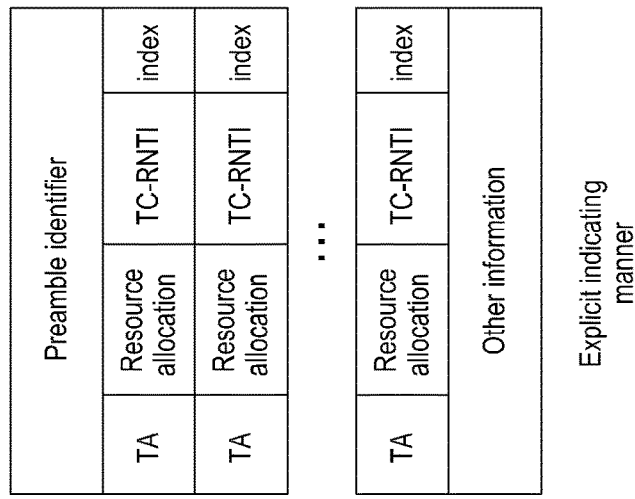
[Fig. 7]
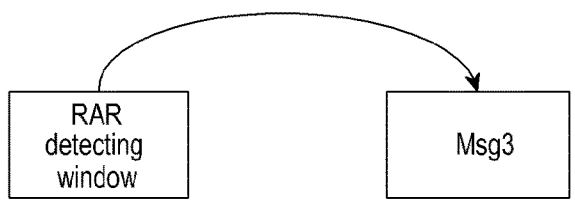
[Fig. 8]
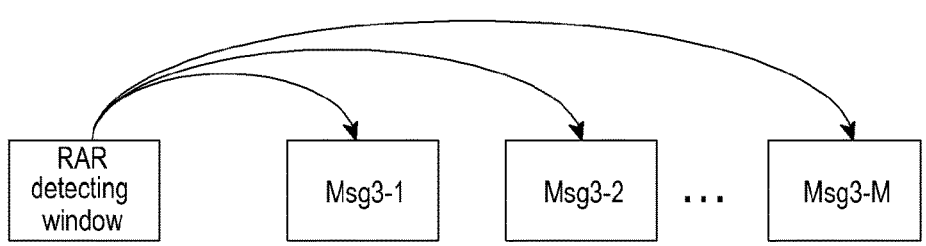

[Fig. 9]
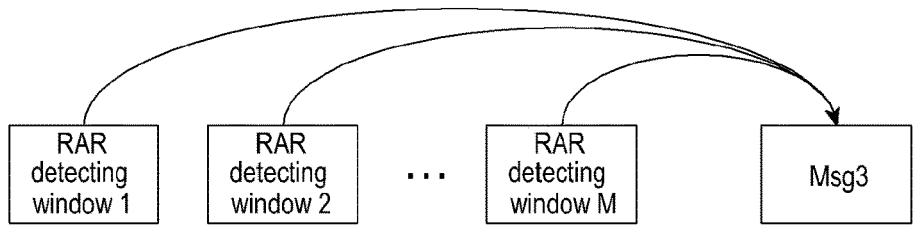
[Fig. 10]
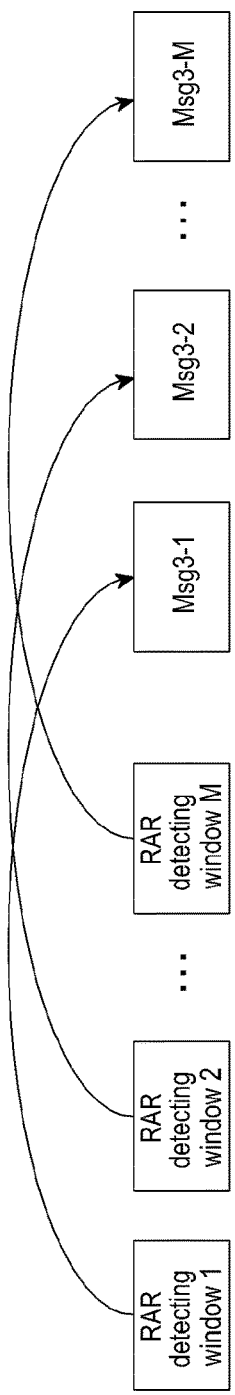

[Fig. 11]
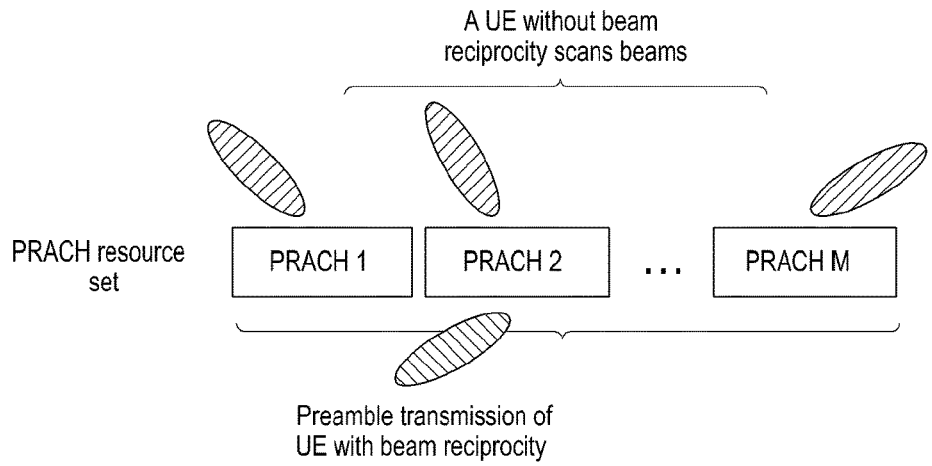
[Fig. 12]
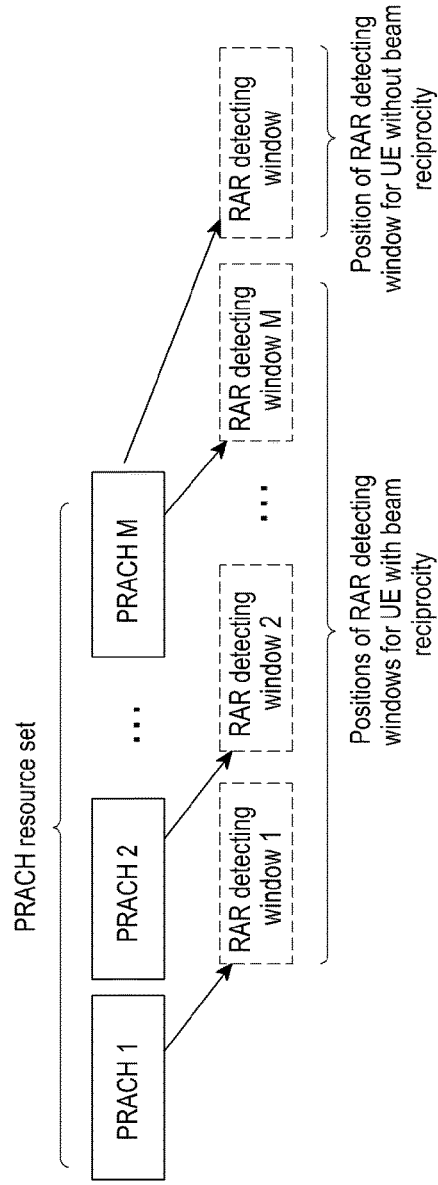

[Fig. 13]
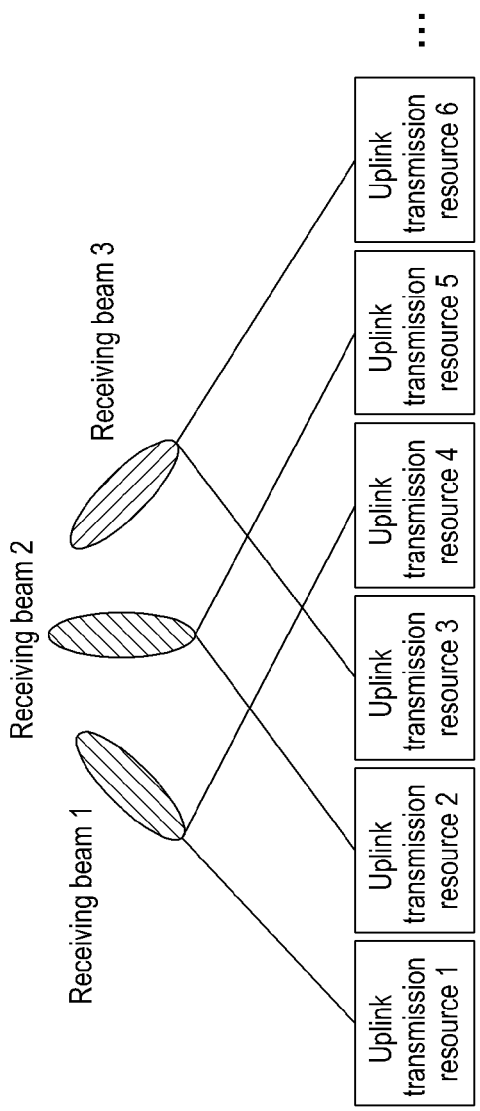

[Fig. 14]
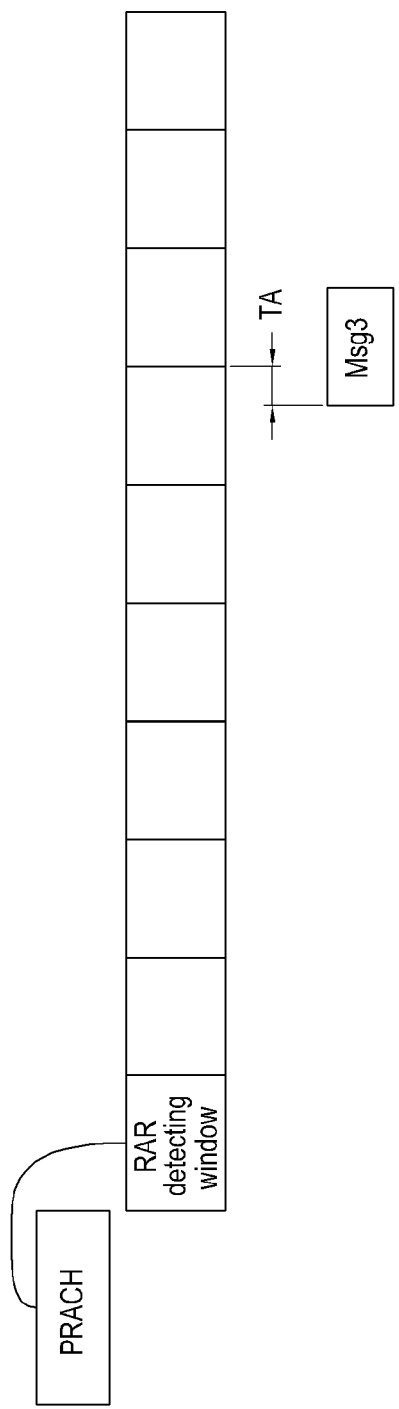

[Fig. 15]
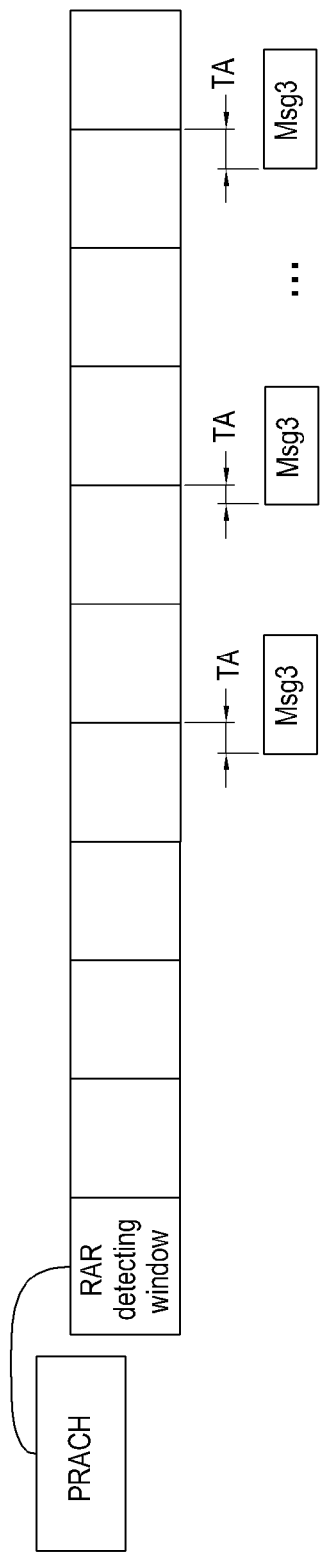

[Fig. 16]
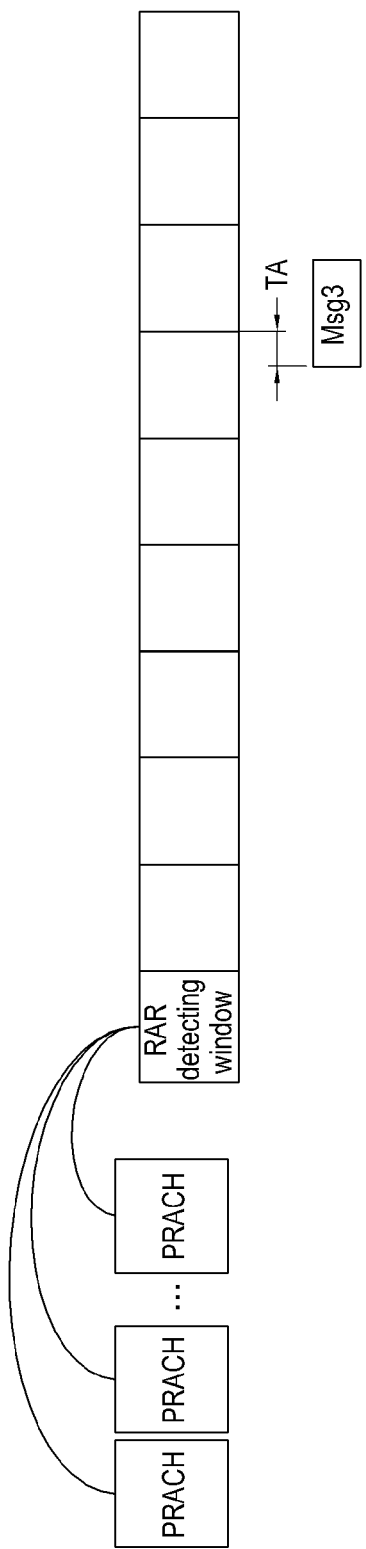

[Fig. 17]
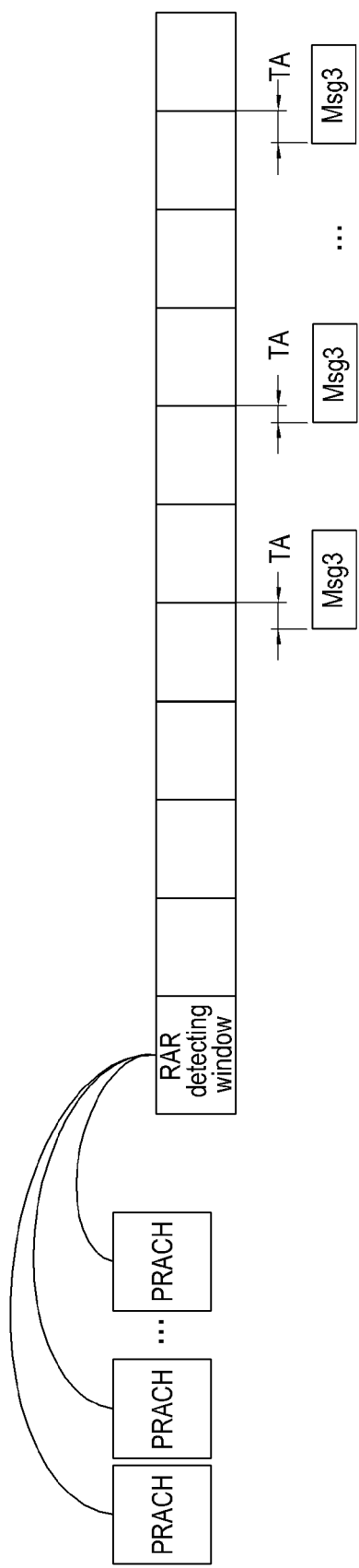

[Fig. 18]
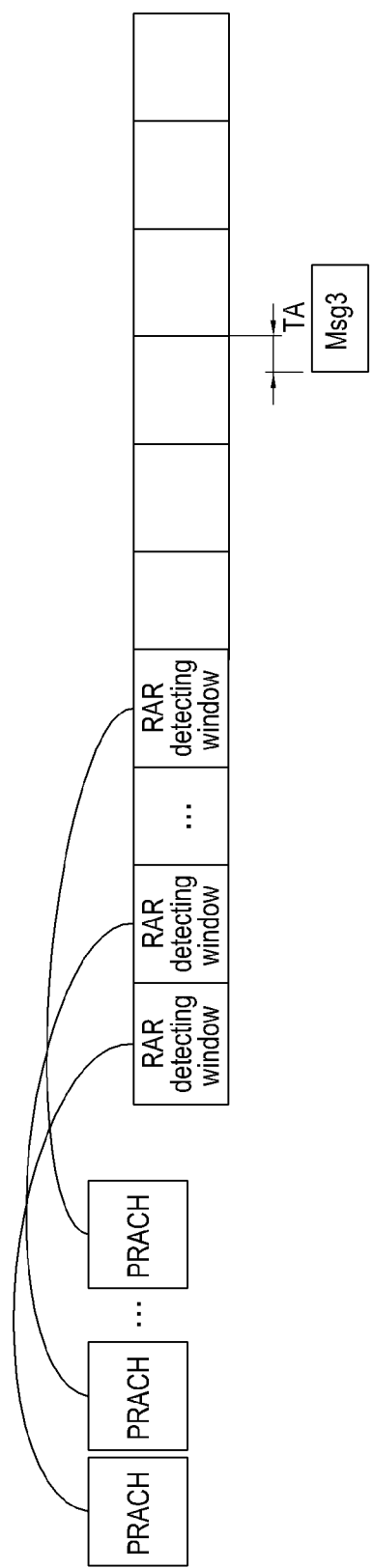

[Fig. 19]
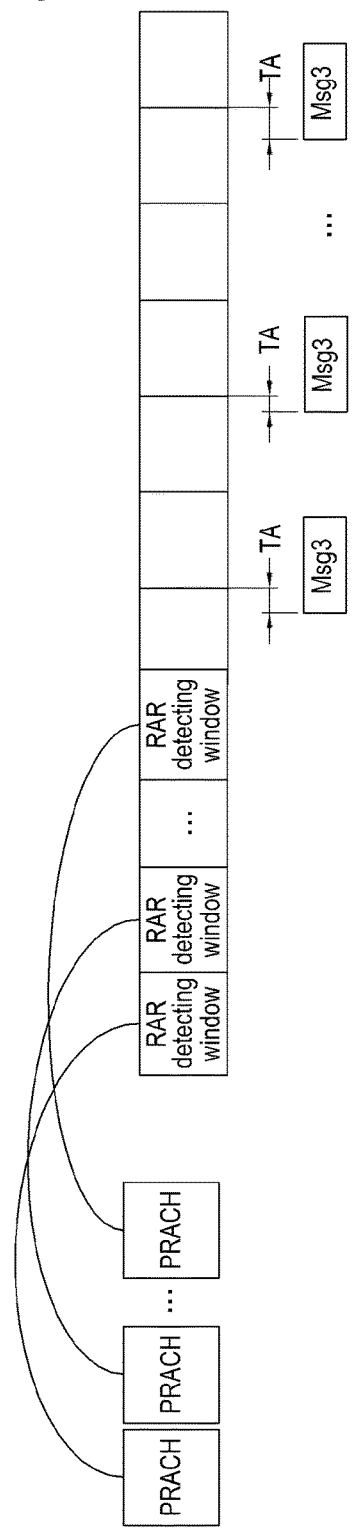
[Fig. 20]
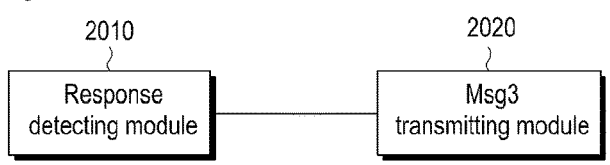

[Fig. 21]
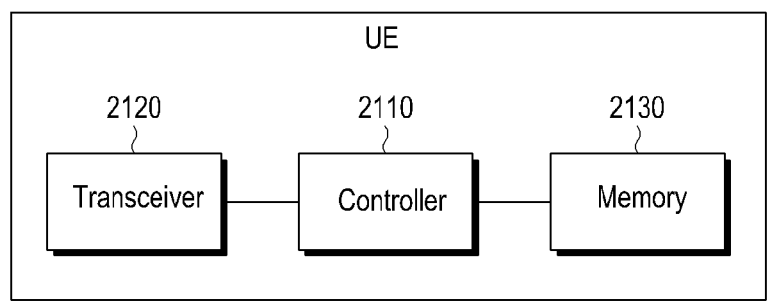
[Fig. 22]
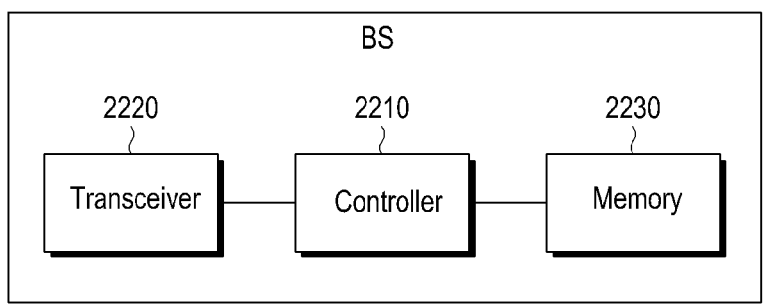

APPARATUS AND METHOD FOR PERFORMING A RANDOM ACCESS

CROSS-REFERENCE TO RELATED APPLICATION(S)

This application is a National Phase Entry of PCT International Application No. PCT/KR2018/001546, which was filed on Feb. 6, 2018, and claims priority to Chinese Patent Application No. 201710067369.8, which was filed on Feb. 6, 2017, the contents of which are incorporated herein by reference.

BACKGROUND

1. Field

The present disclosure relates to wireless communications technologies, more particularly to an apparatus and a method for performing a random access.

2. Description of the Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With rapid development of information industry, especially increasing requirements from mobile Internet and Internet of things (IoT), mobile communication techniques are facing unprecedented challenges. According to International Telecommunication Union (ITU) report ITU-R M.[IMT.BEYOND 2020.TRAFFIC], it can be predicted that as of 2020, mobile service amount will increase 1000 times compared with that in 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description including requirement prospect, application scenarios and various important performances of 5G. With respect to new requirements of 5G, the ITU report ITU-R M.[IMT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

SUMMARY

When establishing an initial connection, a UE and a base station do not know a direction of an optimal beam pair, therefore the random access in a 5G communication system faces great challenges. In a multi-beam system, whether the UE has beam reciprocity has a great impact to the random access procedure. Conventional random access solution is not applicable for the 5G multi-beam system.

Embodiments of the present disclosure provide a random access method and a UE, so as to improve overall access performance of a communications system.

Some embodiments of the present disclosure provide a random access method, including: A, during a random access procedure, a User Equipment (UE) receiving a RAR; and B, the UE transmitting at least one Msg3 adopting a corresponding method according to a beam reciprocity capability of the UE.

In some embodiments, the process B includes: the UE transmitting at least one Msg3 adopting the corresponding method according to the beam reciprocity capability of the UE and Msg3 transmission configuration information in the RAR; wherein the Msg3 transmission configuration information includes: TA and Msg3 resource configuration information.

In some embodiments, during the random access procedure, a UE with beam reciprocity transmits a preamble on a physical random access channel (PRACH) within first type PRACH resources; a UE without beam reciprocity transmits same or different preambles on N PRACHs within second type PRACH resources using beam switching or beam polling;

wherein time-frequency positions of the first type PRACH resources and positions of time-frequency positions of the second type PRACH resources are different;

a preamble resource pool corresponding to the first type PRACH resources and a preamble resource pool corresponding to the second type PRACH resources are different, or partially different, or the same.

In some embodiments, the process A includes: for the UE with beam reciprocity, the UE monitoring a downlink control channel in a RAR detecting window using a Random Access-Radio Network Temporary Identifier (RA-RNTI) corresponding to a PRACH on which the preamble is transmitted, if downlink control information scrambled by the corresponding RA-RNTI is detected on the downlink control channel, reading a RAR on a downlink shared channel indicated by the downlink control information, and obtaining the TA and the Msg3 resource configuration information in the RAR;

the process B includes: transmitting the at least one Msg3 according to at least one of the following manners B1 to B3:

B1, if the RAR includes one TA and Msg3 resource configuration information, transmitting one Msg3 according to the detected TA and the Msg3 resource configuration information;

B2, if the RAR includes at least two TAs and Msg3 resource configuration information, selecting according to a predefined rule or randomly selecting at least one TA and Msg3 resource configuration information, and transmitting one Msg3 respectively according to each selected TA and Msg3 resource configuration information; or B3, if the RAR includes at least two TAs and the Msg3 resource configuration information, respectively transmitting one Msg3 according to each detected TA and Msg3 resource configuration information.

In some embodiments, the process A includes: for the UE without beam reciprocity, if a base station configures one RAR detecting window, the UE monitoring the downlink control channel in the RAR detecting window simultaneously using RA-RNTIs corresponding to N PRACHs on which the preamble is transmitted, if successfully decoding in the RAR detecting window according to at least one RA-RNTI, reading downlink resource allocation allocated by the corresponding control channel, if detecting an identifier of the transmitted preamble on the downlink resource allocation corresponding to the at least one RA-RNTI, determining that the RAR detection succeeds;

the process B includes: transmitting the at least one Msg3 according to at least one of the following manners B4 to B9:

B4, if the UE detects one of the TA and the Msg3 resource configuration information, transmitting one Msg3 according to the detected TA and the Msg3 resource configuration information;

B5, if the UE detects at least two TAs and the Msg3 resource configuration information, selecting according to a predefined rule or randomly selecting at least one of the TA and the Msg3 resource configuration information, and transmitting one Msg3 respectively according to each selected TA and Msg3 resource configuration information;

B6, if the UE detects at least two TAs and the Msg3 resource configuration information, respectively transmitting one Msg3 according to each detected TA and Msg3 resource configuration information;

B7, predefining a maximum number for the TA and the Msg3 resource configuration information, after the UE detects the maximum number of TAs and the Msg3 resource configuration information, or after the UE has detected all TAs and the Msg3 resource configuration information but does not detect the maximum number of TAs and Msg3 resource configuration information, stopping the RAR detection; if one TA and Msg3 resource configuration information is detected, transmitting one Msg3 according to the detected TA and the Msg3 resource configuration information;

B8, predefining a maximum number for the TA and the Msg3 resource configuration information, after the UE detects the maximum number of TAs and the Msg3 resource configuration information, or after the UE has detected all TA and the Msg3 resource configuration information but does not detect the maximum number of TAs and Msg3 resource configuration information, stopping the RAR detection; if at least two TAs and the Msg3 resource configuration information are detected, selecting according to a predefined rule or randomly selecting at least one TA and Msg3 resource configuration information, and respectively transmitting one Msg3 according to each selected TA and Msg3 resource configuration information; or B9, predefining a maximum number for the TA and the Msg3 resource configuration information, after the UE detects the maximum number of TAs and the Msg3 resource configuration information, or after the UE has detected all TAs and the Msg3 resource configuration information but does not detect the maximum number of TAs and Msg3 resource configuration information, stopping the RAR detection; if at least two TAs and Msg3 resource configuration information are detected, respectively transmitting one Msg3 according to each of the detected TAs and Msg3 resource configuration information.

In some embodiments, the process A includes: for the UE without beam reciprocity, if the base station configures at least two RAR detecting windows and allocates N PRACHs, the UE monitoring N RAR detecting windows;

the process B includes: transmitting the at least one Msg3 according to at least one of the following manners B10 to B15:

B10, if the UE detects one RAR in all RAR detecting windows, and the RAR includes one TA and Msg3 resource configuration information, transmitting one Msg3 according to the detected TA and Msg3 resource configuration information;

B11, if the UE detects, in all RAR detecting windows, at least two RARs or one RAR containing at least two TAs and Msg3 resource configuration information, selecting according to a predefined rule or randomly selecting at least one TA and Msg3 resource configuration information of at least one RAR, and respectively transmitting one Msg3 according to each selected TA and Msg3 resource configuration information;

B12, if the UE detects, in all RAR detecting windows, at least two RARs or one RAR containing at least two TAs and Msg3 resource configuration information, respectively transmitting one Msg3 according to each TA and Msg3 resource configuration information in the detected RAR;

B13, predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if one RAR is detected, and the RAR contains one TA and Msg3 resource configuration information, transmitting one Msg3 according to the detected TA and Msg3 resource configuration information;

B14, predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if at least two RARs are detected, or one RAR is detected and the RAR contains at least two TAs and Msg3 resource configuration information, selecting according to a predefined rule or randomly selecting at least one TA and Msg3 resource configuration information in at least one RAR, and respectively transmitting one Msg3 according to each selected TA and Msg3 resource configuration information; or B15, predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if at least two RARs are detected, or one RAR is detected and the RAR contains at least two TAs and Msg3 resource configuration information, respectively transmitting one Msg3 according to each TA and Msg3 resource configuration information in respective detected RAR.

In some embodiments, during the random access procedure, the UE with beam reciprocity selecting a PRACH in a PRACH resource set according to configuration information of a base station or selecting a PRACH with equal probability from all available PRACHs to transmit a preamble in a first type preamble resource pool, or the UE with beam reciprocity transmitting a preamble of the first type preamble resource pool using the same beam on PRACHs within one PRACH resource set; the UE without beam reciprocity transmitting a preamble in a second type preamble resource pool using different beam directions on different PRACHs according to a number of transmission beams supported by the UE without beam reciprocity;

wherein each PRACH resource set includes at least two PRACHs, the first type preamble resource pool and the second type preamble pool are different.

In some embodiments, if the UE detect in one RAR detecting window, the process B includes at least one of:

B11, the UE detects in the RAR detecting window, and detects one TA and Msg3 resource configuration information, transmitting one Msg3 according to the detected TA and Msg3 resource configuration information;

B13, the UE detects in the RAR detecting window, and detects at least one TA and Msg3 resource configuration information, selecting one TA and Msg3 resource configuration information, and transmitting one Msg3 according to the selected TA and Msg3 resource configuration information;

B14, the UE detects in the RAR detecting window, and detects at least one TA and Msg3 resource configuration information and a corresponding ranked position index, selecting one TA and Msg3 resource configuration information according to the ranked position index, and transmitting one Msg3 according to the selected TA and Msg3 resource configuration information;

B21, the UE detects in one RAR detecting window, and detects at least one TA and Msg3 resource configuration information, selecting all or some of the TAs and Msg3 resource information, and respectively transmitting one Msg3 according to each selected TA and Msg3 resource configuration information;

B22, the UE detects in one RAR detecting window, and detects at least one TA and Msg3 resource configuration information and a corresponding ranked position index, selecting all or some of the TAs and Msg3 resource configuration information according to the ranked position index, and respectively transmitting one Msg3 according to each selected TA and Msg3 resource configuration information;

B35, predefining a maximum number for the TA and Msg3 resource configuration information, the UE detecting in one RAR detecting window, after the UE detects the maximum number of TAs and Msg3 resource configuration information, or after the UE has detected all TAs and Msg3 resource configuration information but fails to detect the maximum number of TAs and Msg3 resource configuration information, stopping the RAR detection; if one TA and Msg3 resource configuration information is detected, transmitting one Msg3 according to the detected TA and Msg3 resource configuration information;

B37, predefining a maximum number for the TA and Msg3 resource configuration information, the UE detecting in one RAR detecting window, after the UE detects the maximum number of TAs and Msg3 resource configuration information, or after the UE has detected all TA and Msg3 resource configuration information but fails to detect the maximum number of TAs and Msg3 resource configuration information, stopping the RAR detection; if at least one TA and Msg3 resource configuration information is detected, selecting one TA and Msg3 resource configuration information, and transmitting one Msg3 according to the selected TA and Msg3 resource configuration information; or B38, predefining a maximum number for the TA and Msg3 resource configuration information, the UE detecting in one RAR detecting window, after the UE detects the maximum number of TAs and Msg3 resource configuration information, or after the UE has detected all TAs and Msg3 resource configuration information but fails to detect the maximum number of TAs and Msg3 resource configuration information, stopping the RAR detection; if one or more TAs and Msg3 resource configuration information and a corresponding ranked position index is detected, selecting one TA and Msg3 resource configuration information based on the ranked position index, and transmitting one Msg3.

In some embodiments, if the UE detects in at least two RAR detecting windows, the process B includes at least one of:

B43, predefining a maximum number for the TA and the Msg3 resource configuration information, after the UE detects the maximum number of TAs and Msg3 resource configuration information, or after the UE has detected all TAs and Msg3 resource configuration information but fails to detect the maximum number of TAs and Msg3 resource configuration information, stopping the RAR detection; if at least two TAs and Msg3 resource configuration information are detected, selecting all or some of the detected TAs and Msg3 resource configuration information, and respectively transmitting one Msg3 according to each selected TA and Msg3 resource configuration information;

B44, predefining a maximum number for the TA and the Msg3 resource configuration information, after the UE detects the maximum number of TAs and Msg3 resource configuration information, or after the UE has detected all TAs and Msg3 resource configuration information but fails to detect the maximum number of TAs and Msg3 resource configuration information, stopping the RAR detection; if multiple TAs and Msg3 resource configuration information and corresponding ranked position indexes are detected, selecting all or some of the TAs and Msg3 resource configuration information based on the ranked position indexes, and respectively transmitting one Msg3 according to each selected TA and Msg3 resource configuration information;

B51, the UE detecting in at least two RAR detecting windows, if one RAR is detected, and the RAR contains one TA and Msg3 resource configuration information, transmitting one Msg3 according to the detected TA and Msg3 resource configuration information;

B53, the UE detecting in at least two RAR detecting windows, if the UE detects at least two RARs, or detects one RAR containing at least one TA and Msg3 resource configuration information, selecting one TA and Msg3 resource configuration information, and transmitting one Msg3;

B54, the UE detecting in at least two RAR detecting windows, if the UE detects at least two RARs respectively containing a ranked position index, or detects one RAR containing at least one TA, Msg3 resource configuration information and a ranked position index, selecting one TA and Msg3 resource configuration information according to the ranked position index, and transmitting one Msg3;

B55, predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if one RAR is detected and the RAR contains one TA and Msg3 resource configuration information, transmitting one Msg3 according to the detected TA and Msg3 resource configuration information;

B57, predefining a maximum number for the RAR or for the TA and the Msg3 resource configuration information, the UE detecting in at least two RAR detecting windows, after the UE detects the maximum number RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if at least two RARs are detected, or one RAR containing at least one TA and Msg3 resource configuration information is detected, selecting one TA and Msg3 resource configuration information, and transmitting one Msg3;

B58, predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs respectively containing a ranked position index, or detects one RAR containing at least one TA and Msg3 resource configuration information and a ranked position index, selecting one TA and Msg3 resource configuration information based on the ranked position index, and transmitting one Msg3;

B61, the UE detecting in at least two RAR detecting windows, if the UE detects at least two RARs, or detects one RAR containing at least one TA and Msg3 resource configuration information, selecting all or some pieces of the detected TA and Msg3 resource configuration information, and respectively transmitting one Msg3 according to each selected TA and Msg3 resource configuration information;

B62, the UE detecting in at least two RAR detecting windows, if the UE detects at least two RARs respectively containing a ranked position index, or detects one RAR containing at least one TA and Msg3 resource configuration information and a ranked position index, selecting all or some of the TAs and the Msg3 resource configuration information based on the ranked position index, and respectively transmitting one Msg3 according to each selected TA and Msg3 resource configuration information;

B63, predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs, or detects one RAR containing at least one TA and Msg3 resource configuration information, selecting all or some of the TAs and Msg3 resource configuration information, and respectively transmitting one Msg3 according to each selected TA and Msg3 resource configuration information; or B64, predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs respectively containing a ranked position index, or detects one RAR containing one or more TAs and Msg3 resource configuration information and a ranked position index, selecting all or some of the TAs and the Msg3 resource configuration information according to the ranked position index, and respectively transmitting one Msg3 according to each selected TA and Msg3 resource configuration information.

In some embodiments, a User Equipment (UE) includes: a response detecting module and an Msg3 transmitting module; wherein the response detecting module is configured to detect a RAR; and the Msg3 transmitting module is configured to transmit at least one Msg3 adopting a method corresponding to a beam reciprocity capability of the UE.

In view of the above technical solution, the present disclosure provides a random access method and a UE for a beamforming-based 5G wireless communications system. The UE transmits one or more Msg3 based on its beam reciprocity capability. Compared with conventional techniques, the UE in the present disclosure adopts different methods for transmitting the random access message Msg3 according to the beam reciprocity capability of the UE, which avoids the decrease of the random access performance caused by improper resource configuration and improper transmission manner. As such, the overall access performance of the communications system is improved.

In some embodiments, a method for proving a random access by a base station (BS) includes: transmitting, to a user equipment (UE), a random access response (RAR), and receiving, from the UE, at least one Msg3 corresponding to a beam reciprocity capability of the UE.

In some embodiments, a base station (BS) for proving a random access includes: a transceiver, and a controller configured to: control the transceiver to transmit, to a user equipment (UE), a random access response (RAR), and receive, from the UE via the transceiver, at least one Msg3 corresponding to a beam reciprocity capability of the UE.

BRIEF DESCRIPTION OF THE DRAWINGS

FIG. 1 is a flowchart illustrating a conventional connection-based random access procedure.

FIG. 2 is a schematic diagram illustrating conventional RAR detection and Msg3 transmission method in a LTE system.

FIG. 3 is a flowchart illustrating a random access procedure according to various embodiments of the present disclosure.

FIG. 4 is a schematic diagram illustrating a division manner for PRACH resources according to embodiment 1 of the present disclosure.

FIG. 5 is a schematic diagram illustrating configuration of a RAR detecting window according to embodiment 1 of the present disclosure.

FIG. 6 shows an exemplary RAR in embodiment 1 of the present disclosure.

FIG. 7 is a schematic diagram illustrating a process that a UE detects in a single RAR detecting window and transmits a single Msg3 according to embodiment 1 of the present disclosure.

FIG. 8 is a schematic diagram illustrating a process in which the UE detects in a single RAR detecting window and transmits multiple Msg3 according to embodiment 1 of the present disclosure.

FIG. 9 is a schematic diagram illustrating a process in which the UE detects in multiple RAR detecting windows and transmits a single Msg3 according to embodiment 1 of the present disclosure.

FIG. 10 is a schematic diagram illustrating a process in which the UE detects in multiple RAR detecting windows and transmits multiple Msg3 according to embodiment 1 of the present disclosure.

FIG. 11 is a schematic diagram illustrating transmission of preambles under different reciprocity conditions according to embodiment 2 of the present disclosure.

FIG. 12 is a schematic diagram illustrating a RAR detecting window according to embodiment 2 of the present disclosure.

FIG. 13 is a schematic diagram illustrating a process that the base station allocates Msg3 uplink resources according to embodiment 2 of the present disclosure.

FIG. 14 is a schematic diagram illustrating a process that a UE with beam reciprocity detects in a single RAR detecting window and transmits a single Msg3 according to embodiment 2 of the present disclosure.

FIG. 15 is a schematic diagram illustrating a process that a UE with beam reciprocity detects in a single RAR detecting window and transmits multiple Msg3 according to embodiment 2 of the present disclosure.

FIG. 16 is a schematic diagram illustrating a process that a UE without beam reciprocity detects in a single RAR detecting window and transmits a single Msg3 according to embodiment 2 of the present disclosure.

FIG. 17 is a schematic diagram illustrating a process that a UE without beam reciprocity detects in a single RAR detecting window and transmits multiple Msg3 according to embodiment 2 of the present disclosure.

FIG. 18 is a schematic diagram illustrating a process that a UE without beam reciprocity detects in multiple RAR detecting windows and transmits a single Msg3 according to embodiment 2 of the present disclosure.

FIG. 19 is a schematic diagram illustrating a process that a UE without beam reciprocity detects in multiple RAR detecting windows and transmits multiple Msg3 according to embodiment 2 of the present disclosure.

FIG. 20 is a schematic diagram illustrating a structure of a UE according to some embodiments of the present disclosure.

FIG. 21 is a schematic diagram illustrating a structure of a terminal (i.e., UE) according to an embodiment of the present disclosure.

FIG. 22 is a schematic diagram illustrating a structure of a base station (i.e., eNB, NB, or gNB) according to an embodiment of the present disclosure.

DETAILED DESCRIPTION

The present disclosure will be described in detail hereinafter with reference to accompanying drawings and embodiments to make the technical solution and merits therein clearer.

Random access procedure is an important procedure in wireless communications systems. It is used for establishing uplink synchronization between the base station and the UE and for allocating ID for UEs by the base station. The random access performance directly affects the users' experience. For a conventional wireless communications system, the random access procedure is used for initial connection setup, cell handover, uplink connection re-establishment, RRC connection re-setup and other scenarios, and may include a connection-based random access and a connection-free random access. In the connection-based random access, each UE select a preamble from the same preamble resource pool when attempting to set up uplink connection. Multiple UEs may select and transmit the same preamble to the base station. Therefore, this contention will lead to failure of transmission of the preamble. Mechanism for dealing with the contention is an important research field for random access. How to decrease contention probability and how to solve contention rapidly are key factors affecting the random access performance.

The connection-based random access includes four steps, as shown in FIG. 1. Before the random access procedure, the base station (20) transmits configuration information of the random access procedure to the UE (10). The UE performs random access according to the received configuration information, as shown in FIG. 1.

In step 1 (110), the UE (10) selects a preamble from a preamble resource pool and transmits the preamble to the base station (20). The base station performs correlation detection to the received signals to recognize the preamble transmitted by the UE.

In step 2 (120), the base station transmits a random access response (RAR) to the UE, including a random access preamble identifier, a timing advance command determined according to an estimated delay between the base station and the UE, a Temporary Cell-Radio Network Temporary Identifier (TC-RNTI), and time-frequency resources allocated for the UE for next time uplink transmission.

In step 3 (130), the UE transmits Msg3 to the base station according to the information contained in the RAR. The Msg3 includes information such as UE identifier and RRC connection request, wherein the UE identifier is unique among all UEs and is used for resolving contention.

In step 4 (140), the base station transmits a contention resolution identifier to the UE, including a winner UE identifier in the contention resolution. After detecting the identifier of itself, the UE upgrades the TC-RNTI to a C-RNTI, and transmits an ACK to the base station to finish the random access procedure, and waits for scheduling of the base station. Otherwise, the UE backs off for a period of time and starts a new random access procedure.

It should be noted that, in step 2 (120), the UE expects to receive the RAR within a time window. The length of the RAR detecting window is configured by higher layer signaling. It starts at the subframe that contains the end of the preamble transmission plus three subframes. The UE monitors the physical downlink control channel within the RAR detecting window configured by the higher layer signaling. After detecting the RAR, the UE transmits Msg3 according to the timing advance (TA) and the allocated uplink resources contained in the RAR. FIG. 2 shows an example in which the length of the RAR detecting window is configured to be 3 subframes.

For the connection-free random access procedure, since the base station already knows the UE identifier, the base station may assign a preamble for the UE. Therefore, when transmitting the preamble, the UE does not need to randomly select a preamble. Instead, the UE uses the assigned preamble. After detecting the assigned preamble, the base station transmits a corresponding RAR, including information such as TA and uplink resource allocation. After receiving the RAR, the UE determines that the uplink synchronization is completed and waits for scheduling of the base station. Therefore, the initial access and the connection-free random access procedure include merely two steps: in step 1, the preamble is transmitted; in step 2, the RAR is transmitted. For the connection-free random access procedure, the base station still configures a power ramping mechanism for preamble retransmission.

Millimeter-wave communication is a possible important technique for 5G. Through enhancing the carrier frequency to the millimeter-wave band, the available bandwidth is increased greatly. Therefore, the system transmission speed may be greatly increased. In order to dealing with features such as high fading and high loss of the millimeter-wave band, beamforming is generally used in millimeter-wave band communication systems, i.e., concentrating the beam energy in a particular direction through using a weight factor. During the wireless communications, the base station and the UE find the optimal beam pair via manners such as polling, so as to maximize the receiving signal noise ratio at the base station and the UE. During the establishment of the initial connection, the UE and the base station do not know the direction of the optimal beam pair. Therefore, the random access in the millimeter-wave communications system faces great challenges.

As described above, when establishing an initial connection, the UE and the base station do not know the direction of the optimal beam pair, therefore the random access in the 5G communication system faces great challenge. In a multi-beam system, whether the UE has beam reciprocity has a great impact to the random access procedure. Conventional random access solution is not applicable for the 5G multi-beam system. In this case, it is required to distinguish UEs with beam reciprocity and UEs without beam reciprocity. The transmission of Msg3 during the random access procedure needs also be adjusted to be applicable for UEs with different capabilities.

For a multi-beam 5G wireless communications system, embodiments of the present disclosure provide a method for transmitting random access message Msg3. In embodiments of the present disclosure, with respect to different UE beam reciprocity capabilities, a base station respectively configures different PRACH resources, transmits RARs according to corresponding time sequence, and configures different RAR detecting windows for the UEs. Based on the different RAR detecting window configurations, the UE detects one or more RARs, and transmits one or more Msg3 according to the detected TA, resource configuration, etc.

In embodiments of the present disclosure, for different beam reciprocity capabilities, the UE adopts different random access Msg3 transmitting methods, which avoids decrease of random access performance due to inappropriate resource configuration and transmission manner, and improves overall access performance of the communication system.

Suppose that the system supports random access of both UEs with beam reciprocity and UEs without beam reciprocity. In particular, the system may divide channel resources available for the random access into first type PRACH resources and second type PRACH resources. The first type PRACH resources is used for the random access procedure of the UE with beam reciprocity, and the second type PRACH resources is used for the random access procedure of the UEs without beam reciprocity.

FIG. 3 is a flowchart illustrating a random access procedure according to embodiments of the present disclosure.

In FIG. 3, the random access procedure includes four steps.

In step 1 (310), the base station (20) transmits system configuration information. The system configuration information includes a random access preamble format, PRACH resource configuration, RAR detecting window configuration for the first type UE with beam reciprocity, and the RAR detecting window configuration for the second type UE without beam reciprocity.

In step 2 (320), the UE (10) selects a corresponding PRACH resource and a preamble format according to the system configuration information received in step 1 and according to the beam reciprocity capability of itself, and selects one or more beams to transmit the randomly selected preamble.

In step 3 (330), the base station (20) detects the preamble on the corresponding time-frequency resources. If the base station detects one or more preambles, the base station transmits one or more RARs (RARs) on corresponding downlink time-frequency resources according to the detected preamble and the time-frequency resources where the preamble is located and the detected timing advance. The RAR includes an identifier of the detected preamble, PRACH time-frequency resource information, TA and the allocated cell-radio network temporary identifier (C-RNTI), etc.

In step 4 (340), if the UE (10) detects one or more RARs, and the PRACH time-frequency resources and the preamble identifier included in the RARs respectively matches those used and transmitted in step 2, the UE transmits one or more messages 3 (Msg3) according to the Msg3 resource configuration information and the TA included in the RAR, wherein the Msg3 includes a UE identifier and a RRC connection request, etc.

Hereinafter, the method for transmitting random access Msg3 provided by the present disclosure is described with reference to detailed embodiments.

Embodiment 1

In this embodiment, a method for transmitting a random access message Msg3 is described with reference to a particular system. Suppose that the system supports random access procedures of both UEs with beam reciprocity and UEs without beam reciprocity. In particular, the system divides available PRACH resources into first type PRACH resources and second type PRACH resources. The first type PRACH resources is used for implementing the random access procedure of the UEs with beam reciprocity, and the second type PRACH resources is used for implementing the random access procedure of the UEs without beam reciprocity.

In this embodiment, the first type PRACH resources and the second type PRACH resources use different time-frequency resources, the base station is able to determine whether a UE has beam reciprocity according to the PRACH resources. Therefore, the UE with beam reciprocity and the UE without beam reciprocity may use the same or different preamble resource pool. For example, the UE with beam reciprocity and the UE without beam reciprocity may use two completely different (i.e., non-overlapped) preamble resource pools, or use partially different preamble resource pools (i.e., some preambles are the same), or use the same preamble resource pool. FIG. 4 is a schematic diagram illustrating a division manner for the PRACH resources according to some embodiments of the present disclosure.

The base station informs the UE the system configuration information relevant to the random access via system information in a main information block or a system information block indicated by the main information block on a broadcast channel. In the method provided by the present disclosure, the system configuration information relevant to the random access includes the resource configuration for the first type PRACH resources, including time-frequency positions of the PRACH resources used by the UE with beam reciprocity, information of the preamble resource pool used by the UE with beam reciprocity (range of indexes of the preamble can be used by the UE with beam reciprocity), and information required for the UE with beam reciprocity when detecting the RAR, including length of the RAR detecting window, and time for detecting the RAR.

The system configuration information for the random access further includes resource configuration for the second type PRACH resources, including time-frequency resource positions of the PRACH resources used by the UE without beam reciprocity, information of the preamble resource pool used by the UE without beam reciprocity (index range of the preambles can be used by the UE without beam reciprocity), and information required by the UE without beam reciprocity when detecting the RAR, including length of the RAR detecting window, and the time for detecting the RAR.

If the UE with beam reciprocity and the UE without beam reciprocity use the same preamble resource pool, the information of merely one preamble resource pool (i.e., index range of the preambles) needs to be informed.

The base station detects the preamble on the allocated PRACH. If a preamble is detected, the base station transmits a RAR according to following time sequence:

If the preamble is detected on the first type PRACH, a RAR is transmitted after the last subframe (or slot) allocated to the first type PRACH plus S1 subframes (or slots), and scrambles a corresponding downlink control channel using a RA-RNTI corresponding to the PRACH resources.

If the preamble is detected on the second type PRACH, and if the base station has allocated multiple PRACHs (used for the UEs without beam reciprocity attempting to transmit the preamble via transmitting beams in different directions), the base station transmits a RAR after the last subframe (or slot) allocated to the last PRACH plus S2+$\Delta$ subframes (or slots), and scrambles a corresponding downlink control channel using the RA-RNTI corresponding to the PRACH resources, wherein $\Delta$ is an optional parameter. If $\Delta$=0, the multiple RARs are transmitted in the same subframe (or slot). On the other hand, the value of $\Delta$ may be relevant to the index of the PRACH, i.e., different RAR detecting windows are adopted for different detected PRACHs. The above two RAR transmitting methods are shown in FIG. 5.

It should be noted that, in the above configuration, parameters S1 and S2 may be the same or different.

For the UE without beam reciprocity, the base station configures multiple PRACHs for the UE to transmit preamble in a beam switching manner on the multiple PRACHs. In this situation, the base station may detect the same preamble on the multiple PRACHs. At this time, the resources for the RAR may be configured according to the two manners as shown in FIG. 5.

Manner 1: $\Delta$=0. The RA-RNTIs corresponding to the multiple PRACHs indicate, on the same downlink control channel, different downlink shared channels on which different RARs are transmitted. In this situation, the base station may select, from the PRACHs on which the preamble is detected, a PRACH with the highest receiving energy, calculate corresponding TA, transmit a RAR on a downlink shared channel indicated by the RA-RNTI corresponding to this PRACH. Or, the base station may calculate corresponding TA respectively according to all or some of the PRACHs on which the preamble is detected, indicates, on the downlink control channel, different downlink shared channels by the RA-RNTIs corresponding to these PRACHs to transmit RARs. In addition, besides calculating the TA, the base station may sort all or some of the PRACHs on which the preamble is detected (in a descending order of correlation detection output values of the preamble); assigns an index denoting a ranked position for each PRACH in turn, and indicates, on the corresponding downlink control channel, a downlink shared channel using the RA-RNTI corresponding to the PRACH to transmit a RAR containing the index.

Manner 2: $\Delta \neq 0$ and is relevant to the PRACH. In this situation, the RA-RNTIs corresponding to multiple PRACHs indicate, on different downlink control channels, different downlink shared channels for transmitting different RARs. In this manner, the positions of the RARs corresponding to different PRACHs are different. If the base station detects that the same preamble is transmitted on multiple PRACHs, the base station selects the PRACH with the highest receiving energy, and transmits a RAR at a RAR transmission time corresponding to the PRACH. Or, the base station transmits a corresponding RAR at each RAR transmission time corresponding to all or some of the PRACHs on which the preamble is detected. Or, the base station sorts all or some of the PRACHs on which the preamble is detected (in a descending order of correlation detection output values of the preamble), assigns an index denoting a ranked position for each PRACH in turn, and transmits a RAR containing the index at each random access time corresponding to all or some of the PRACHs on which the preamble is detected.

It should be noted that, the detected preamble described above has a correlation detection result larger than a predefined threshold. According to the correlation detection result, information such as TA can be calculated.

It should be noted that, in the embodiment as shown in FIG. 5, the PRACHs in the PRACH resource set are discrete in time. In another embodiment, the PRACHs in the PRACH resource set are continuous in time. The PRACH resource set corresponding to different broadcast channel resources are differentiated via time or frequency, to be corresponding to different transmission beam directions of the base station.

It should be noted that, in the case that the base station does not support beam reciprocity, the base station needs to configure that the same preamble is repeatedly transmitted, and the base station detects the preamble via a receiving beam scanning manner. In this situation, the base station may detect the same preamble on multiple receiving beams on the same PRACH. At this time, the base station may adopt any one of the following manners 1 to 3.

Manner 1: if the base station detects the same preamble in multiple receiving beam directions, the base station selects the receiving beam direction with the highest receiving energy or the largest preamble correlation detection output value, calculates the corresponding TA, generates a RAR, and transmits the RAR on a physical shared channel indicated by the RA-RNTI generated according to the time-frequency resources corresponding to the PRACH.

Manner 2: if the base station detects the same preamble in multiple receiving beam directions, the base station calculates the TA required by the receiving beam direction of all or some of the preambles, and transmits a RAR on a physical downlink shared channel indicated by the RA-RNTI generated according to the time-frequency resources corresponding to the PRACH, wherein the RAR includes one or more TAs, corresponding Msg3 resource allocation information and an allocated TC-RNTI.

Manner 3: if the base station detects the same preamble in multiple receiving beam directions, the base station sorts all or some of the receiving beam directions in which the preamble is detected. The sorting may be performed according to a descending order or correlation detection output value of the preamble, and an index representing the ranked position may be allocated for the TA and Msg3 resource allocation indicator detected in the receiving beam direction. In the RAR, the base station informs the UE of the TA, the corresponding Msg3 resource allocation information, and the TC-RNTI allocated for the preamble detected in the receiving beam direction, and informs the UE of the corresponding index explicitly or implicitly. In the explicit manner, the corresponding index is informed directly. In the implicit manner, the TA and the Msg3 resource allocation are sorted according to the order of the index. FIG. 6 shows an example of the explicit and implicit informing manners in the RAR.

In FIG. 6, other information refers to other information contained in the RAR.

The above operations at the base station may impact the detection of the RAR at the UE. Before a random access attempt, the UE reads PRACH configuration information from the broadcast channel in a synchronization signal block, obtains the PRACH resources allocated to the UE with beam reciprocity and those allocated to the UE without beam reciprocity, and the corresponding configuration of the RAR detecting window. The configuration of the RAR detecting window includes starting position parameters S1, S2, and Δ of the RAR detecting window, length of the RAR detecting window, etc. After transmitting the preamble, the UE may perform the following operations to detect the RAR and transmit the Msg3.

For the UE with beam reciprocity, after the preamble is transmitted, a downlink control channel may be monitored in the RAR detecting window using the RA-RNTIs associated with the time-frequency resources of the PRACHs used for transmitting the preamble. The RAR detecting window starts at the last subframe (slot) that contains the preamble transmission plus S1 subframes and has a length of N1 subframes (slots), which are configured and informed to the UE by the base station via random access configuration information. For the UE with beam reciprocity, the downlink control channel is monitored via merely one RA-RNTI (which is determined according to the time-frequency resources of the PRACH on which the preamble is transmitted). If downlink control information scrambled by the corresponding RA-RNTI is detected on the downlink control channel, a RAR is read on a downlink shared channel indicated by the downlink control information. If the detection of the RAR succeeds, the Msg3 may be transmitted via any one of the following manners:

1, if the RAR contains one TA and Msg3 resource configuration information, one Msg3 is transmitted according to the detected TA and Msg3 resource configuration information.

2, if the RAR contains multiple TAs and Msg3 resource configuration information, one or more TAs and Msg3 resource configuration information may be selected according to a predefined rule, or one or more TAs and Msg3 resource configuration information may be randomly selected, and one Msg3 is transmitted respectively according to each of the selected one or more TAs and Msg3 resource configuration information.

3, if the RAR contains multiple TAs and Msg3 resource configuration information, one Msg3 is transmitted respectively according to each detected TA and Msg3 resource configuration information.

For the UE without beam reciprocity, the base station configures multiple PRACHs, for use by the UE without beam reciprocity to transmit the same or different preambles in a beam switching/scanning manner. If the base station configures single RAR detecting window (configuration manner 1 as shown in FIG. 5), the RAR detecting window starts at the last subframe (slot) of the last PRACH plus S2 subframes (slots), and the length of the RAR detecting window is N2 subframes (slots), which are configured and informed to the UE by the base station via random access configuration information. In this manner, the UE needs to monitor the downlink control channel simultaneously using multiple RA-RNTIs, wherein the multiple RA-RNTIs are determined by the PRACHs on which the UE transmits the preambles. If the UE successfully decodes in the RAR detecting window using one or more RA-RNTIs, the UE reads the downlink resource allocation allocated by the corresponding control channel. If an identifier of the transmitted preamble is detected on the downlink resources corresponding to the one or more RA-RNTIs, it indicates that the detection of the RAR succeeds. In this case, the Msg3 may be transmitted via any of the following manners 4 to 9:

4, if the UE detects one TA and Msg3 resource configuration information, the UE transmits one Msg3 according to the detected TA and Msg3 resource configuration information.

5, if the UE detects multiple TAs and Msg3 resource configuration information, the UE selects one or more TAs and Msg3 resource configuration information according to a predefined rule, or randomly selects one or more TAs and Msg3 resource configuration information of one or more RARs, and transmits one Msg3 respectively according to each of the selected one or more TAs and Msg3 resource configuration information.

6, if the UE detects multiple TAs and Msg3 resource configuration information, the UE transmits one Msg3 respectively according to each TA and Msg3 resource configuration information included in all detected RARs.

7, the UE predefines a maximum number for the TA and the Msg3 resource configuration information. After the UE detects the maximum number of TAs and Msg3 resource configuration information, or the UE fails to detect the maximum number of TAs and Msg3 resource configuration information after finishing the detection for the TA and Msg3 resource configuration information, the UE stops detecting the RAR. If one TA and Msg3 resource configuration information is detected, the UE transmits one Msg3 according to the detected TA and Msg3 resource configuration information.

8, the UE predefines the maximum number for the TA and the Msg3 resource configuration information. After the UE detects the maximum number of TAs and Msg3 resource configuration information, or the UE fails to detect the maximum number of TAs and Msg3 resource configuration information after finishing the detection for the TA and Msg3 resource configuration information, the UE stops detecting the RAR. If multiple TAs and Msg3 resource configuration information are detected, the UE selects one or more TAs and Msg3 resource configuration information according to a predefined rule, or randomly selects one or more TAs and Msg3 resource configuration information, and respectively transmits one Msg3 according to each selected TA and Msg3 resource configuration information.

9, the UE predefines the maximum number for the TA and the Msg3 resource configuration information. After the UE detects the maximum number of TAs and Msg3 resource configuration information, or the UE fails to detect the maximum number of TAs and Msg3 resource configuration information after finishing the detection for the TA and Msg3 resource configuration information, the UE stops detecting the RAR. If multiple TAs and Msg3 resource configuration information are detected, the UE respectively transmits one Msg3 according to each detected TA and Msg3 resource configuration information.

For the UE without beam reciprocity, if the base station configures multiple RAR detecting windows (the configuration manner 2 as shown in FIG. 5), and the base station allocates N PRACHs, the UE monitors the N RAR detecting windows, wherein the RAR detecting window of the n-th PRACH starts at the last subframe (slot) of the last PRACH plus S2+Δn subframes. The RAR detecting windows corresponding to different PRACHs do not overlap with each other. The UE monitors the downlink control channel using the corresponding RA-RNTI in the RAR detecting window corresponding to each PRACH. If the UE successfully decodes in a RAR detecting window using one or more RA-RNTIs, the UE reads the corresponding downlink resource allocation information, and detects a preamble identifier contained in it. If the UE detects that one or more preamble identifiers match the transmitted preambles, it indicates that the detection of the RAR succeeds. In this case, the Msg3 may be transmitted via any one of the following manners 10 to 15.

10, if the UE detects one RAR in all RAR detecting windows, and the RAR contains one TA and Msg3 resource configuration information, the UE transmits one Msg3 according to the detected TA and Msg3 resource configuration information.

11, the UE detects in all RAR detecting windows, if the UE detects multiple RARs, or detects one RAR but it includes multiple TAs and Msg3 resource configuration information, the UE selects one or more TAs and Msg3 resource configuration information of one or more RARs according to a predefined rule, or randomly selects one or more TAs and Msg3 resource configuration information of one or more RARs, and respectively transmits one Msg3 according to each selected TA and Msg3 resource configuration information.

12, the UE detects in all RAR detecting windows, if the UE detects multiple RARs, or detects one RAR but it includes multiple TAs and Msg3 resource configuration information, the UE respectively transmits one Msg3 according to each TA and Msg3 configuration information of all detected RARs.

13, the UE predefines a maximum number for the RAR or for the TA and the Msg3 resource configuration information. After the UE detects the maximum number of RARs or the maximum number of TAs and Msg3 resource configuration information, or after the UE detects in all RAR detecting windows but fails to detect the maximum number of RARs or the maximum number of TAs and Msg3 resource configuration information, the UE stops detecting the RAR. If one RAR is detected and the detected RAR contains merely one TA and Msg3 resource configuration information, the UE transmits one Msg3 according to the detected TA and Msg3 resource configuration information.

14, the UE predefines a maximum number for the RAR or for the TA and the Msg3 resource configuration information. After the UE detects the maximum number of RARs or the maximum number of TAs and Msg3 resource configuration information, or after the UE detects in all RAR detecting windows but fails to detect the maximum number of RARs or the maximum number of TAs and Msg3 resource configuration information, the UE stops detecting the RAR. If multiple RARs are detected, or one RAR is detected but it contains multiple TAs and Msg3 resource configuration information, the UE selects one or more TAs and Msg3 resource configuration information of one or more RARs according to a predefined rule, or randomly selects one or more TAs and Msg3 resource configuration information of one or more RARs, and respectively transmits one Msg3 according to each selected TA and Msg3 resource configuration information.

15, the UE predefines a maximum number for the RAR or for the TA and the Msg3 resource configuration information. After the UE detects the maximum number of RARs or the maximum number of TAs and Msg3 resource configuration information, or after the UE detects in all RAR detecting windows but fails to detect the maximum number of RARs or the maximum number of TAs and Msg3 resource configuration information, the UE stops detecting the RAR. If multiple RARs are detected, or one RAR is detected but it contains multiple TAs and Msg3 resource configuration information, the UE respectively transmits one Msg3 according to each detected TA and Msg3 resource configuration information.

For the UE with beam reciprocity, or for the UE without beam reciprocity but a single RAR detecting window is configured, the procedure may be as shown in FIGS. 7 and 8. FIG. 7 shows the situation that a single Msg3 is transmitted, corresponding to the above manners 1, 4 and 7. FIG. 8 shows the situation that multiple Msg 3 are transmitted, corresponding to the above manners 3, 6, and 9. With respect to different number of Msg3 transmitted by the UE, the manners 2, 5, 8 may correspond to FIG. 7, or FIG. 8.

For the UE without beam reciprocity and multiple RAR detecting windows are configured, the procedure may be as shown in FIGS. 9 and 10. FIG. 9 shows the situation that a single Msg3 is transmitted, corresponding to the above manners 10 and 13. FIG. 10 shows the situation that multiple Msg3 are transmitted, corresponding to the above manners 12 and 15. Depending on the number of Msg 3 transmitted by the UE, manners 11 and 14 may correspond to FIG. 9 or FIG. 10.

It should be noted that, if the detection of the RAR is failed, the procedure may return to step 1 or step 2 as shown in FIG. 3.

Embodiment 2

In this embodiment, a method for transmitting a RAR message Msg3 is described with reference to a particular system. In this embodiment, the UE with beam reciprocity and the UE without beam reciprocity share time-frequency resources, but use non-overlapped random access preamble resource pool. In other words, all available preambles are divided into a first type preamble resource pool and a second type preamble resource pool, the two types of preamble resource pools do not overlap with each other. The first type preamble resource pool is used for the UEs with beam reciprocity, and the second type preamble resource pool is used for the UEs without beam reciprocity.

The base station supports the random access procedure of both the UEs with beam reciprocity and the UEs without beam reciprocity. The base station allocates multiple PRACH resource sets. Each PRACH resource set consists of multiple PRACHs. The division of the PRACH set and the time-frequency positions of the PRACHs within the PRACH set are informed to the UEs by the base station via random access configuration carried in the system information born by a main information block or a system information block indicated by a main information block in the broadcast channel in the synchronization signal block. The PRACH resource sets indicated by the random access configuration information carried in the broadcast channel in different synchronization signal blocks are different, so as to differentiate different transmitting beam directions at the base station. Depending on whether the base station has the beam reciprocity, a single preamble or multiple repeated preamble or multiple different preambles may be transmitted on the PRACHs in the PRACH resource set, which may be informed to the UE via information such as the preamble format.

For the UE with beam reciprocity, the UE selects a PRACH from the PRACH resource set according to the configuration information of the base station, or selects a PRACH with equal probability from the PRACH resource set to transmit the preamble. The base station may also configure the UE to transmit using the same beam on different PRACHs of the same PRACH resource set.

For the UEs without beam reciprocity, the UE may transmit the preamble using different beam directions on different PRACHs according to the number of transmitting beam directions supported by the UE.

The above channel resource allocation and preamble transmission may be as shown in FIG. 11.

In FIG. 11, one PRACH resource set includes M PRACH resources, wherein M is an integer. For the UE with beam reciprocity, the UE selects one PRACH resource from them to transmit the preamble (besides the example as shown in FIG. 11, multiple PRACHs may also be selected for the transmission). For the UE without beam reciprocity, the UE may select multiple or even all of the PRACH resources for transmitting the preamble.

In this embodiment, the manner and procedure for detecting the RAR may be different for the UE with beam reciprocity and the UE without beam reciprocity. In particular, when configuring the PRACH resources, the base station configures the starting positions and lengths of the RAR detecting windows for the two types of UE at the same time when configuring the PRACH resources. For the UE with beam reciprocity, after the preamble is transmitted, the detection of the RAR is started at the last subframe (or slot) of the allocated PRACH resource plus S1 subframes (or slots). For the UE without beam reciprocity, the detection of the RAR is started at the last subframe (or slot) of the PRACH resource set for transmitting the preamble plus S2 subframes (or slots). Parameters S1 and S2 are configured by the base station. If S1=S2, merely one parameter needs to be configured or predefined. The above procedure may be as shown in FIG. 12.

In FIG. 12, the RAR detecting windows of the two types of UEs do not overlap with each other, so as to avoid unwanted contention.

In another situation, if the base station does not have beam reciprocity, the base station needs to configure the UE to transmit repeated preambles, so as to facilitate the base station to receive the preamble using a receiving beam scanning manner. In this situation, the base station may detect the same preamble in multiple receiving beam directions on the same PRACH resource, and obtains multiple TAs. The multiple TAs correspond to the same PRACH and the same preamble, and are therefore transmitted in the same RAR. Besides the TA, the RAR also includes resource configuration information allocated for the transmission of Msg3 and a Temporary Cell-Radio Network Temporary Identifier (TC-RNTI). One method for allocating Msg3 resource configuration information includes: establishing a mapping between the receiving beam of the base station and the uplink transmission resource according to information such as number of receiving beams of the base station and scanning periodicity; after the base station detects the preamble of a PRACH on a receiving beam, allocating corresponding uplink transmission resource based on the above mapping, taking the uplink transmission resource as the Msg3 transmission resource configuration, and transmitting it in the RAR corresponding to the PRACH. It should be noted that, if the preamble of multiple PRACHs is detected on the same receiving beam, different uplink transmission resources should be allocated based on the above mapping. FIG. 13 is a schematic diagram illustrating an uplink resource allocation manner when the number of receiving beams of the base station is 3.

It should be noted that, the uplink transmission resources allocated by the base station for the Msg3 may be continuous in time or discrete in time.

In particular, after the UE transmits the preamble, the transmission of the RAR, the detection of the RAR and the transmission of the Msg3 may be performed according to the following.

If the base station detects one preamble in the first preamble group on a PRACH of the PRACH resource set, the base station calculates the RA-RNTI according to the time-frequency resources of the PRACH on which the preamble is detected, and scrambles the downlink control channel in a corresponding RAR detecting window using the RA-RNTI, and transmits the RAR on the downlink time-frequency resources allocated by the downlink control channel. In particular, the following processing manners may be adopted.

1.1 The base station detects one preamble transmission (i.e., the base station detects one preamble), the base station transmits one RAR containing one TA and Msg3 resource configuration information. The UE detects in one RAR detecting window and detects one TA and Msg3 resource configuration information, and transmits one Msg3 according to the detected TA and Msg3 resource configuration information.

1.2 The base station detects multiple same or different preamble transmissions, selects a preamble with the highest receiving energy or a largest preamble correlation detection output value, and transmits one RAR containing one TA and Msg3 resource configuration information. The UE detects in one RAR detecting window and detects one TA and Msg3 resource configuration information, and transmits one Msg3 according to the detected TA and Msg3 resource configuration information.

1.3 The base station detects multiple same or different preamble transmissions. The base station selects all or some of the preamble transmissions, and transmits one RAR containing multiple TAs and Msg3 resource configuration information. The UE detects in one RAR detecting window and detects one or more TAs and Msg3 resource configuration information, selects one TA and Msg3 resource configuration information, and transmits one Msg3 according to the selected TA and Msg3 resource configuration information.

1.4 The base station detects multiple same or different preamble transmissions, sorts beam directions of all or some of the detected preamble transmissions according to preamble correlation detection output values, and allocates an index representing a ranked position for corresponding TA and Msg3 resource allocation information. Based on the sorted result, the base station selects all or some of the detected preamble transmissions, transmits one RAR containing multiple TAs and Msg3 resource configuration information and corresponding indexes. The UE detects in one RAR detecting window and detects one or more TAs, Msg3 resource configuration information and corresponding indexes, selects one TA and Msg3 resource configuration information based on the indexes, and transmits one Msg3 according to the selected TA and Msg3 resource configuration information.

The above manners 1.1 to 1.4 may be as shown in FIG. 14.

2.1 The base station detects multiple same or different preamble transmissions, selects all or some of the preamble transmissions, and transmits one RAR containing multiple TAs and Msg3 resource configuration information. The UE detects in one RAR detecting window, detects one or more TAs and Msg3 resource configuration information, selects all or some of the TA and Msg3 resource configuration information, and respectively transmits one Msg3 according to each selected TA and Msg3 resource configuration information.

2.2 The base station detects multiple preamble transmissions, sorts beam directions of all or some of the detected preamble transmissions according to preamble correlation detection output values, and allocates an index representing a ranked position for corresponding TA and Msg3 resource allocation information in turn. Based on the sorted result, the base station selects all or some of the detected preamble transmissions, transmits one RAR containing multiple TAs and Msg3 resource configuration information and corresponding indexes. The UE detects in one RAR detecting window and detects one or more TAs, Msg3 resource configuration information and corresponding indexes, selects all or some of the TAs and Msg3 resource configuration information based on the indexes, and transmits one Msg3 respectively according to each selected TA and Msg3 resource configuration information.

The above manners 2.1 and 2.2 may be as shown in FIG. 15.

If the base station detects a preamble of a second preamble group on one or more PRACHs in the PRACH resource set, calculates a RA-RNTI according to the time-frequency resources of the PRACH(s) on which the preamble is detected, and scrambles the downlink control channel corresponding to the same RAR detecting window using the RA-RNTI. In particular, there may be following manners:

3.1 The base station detects one preamble transmission on one PRACH, and transmits one RAR containing one TA and Msg3 resource configuration information. The UE detects in one RAR detecting window, detects one TA and Msg3 resource allocation information, and transmits one Msg3 according to the detected TA and Msg3 resource allocation information.

3.2 The base station detects preamble transmissions on multiple PRACHs, and/or, detects multiple same or different preamble transmissions on one PRACH, the base station selects a preamble transmission with the highest receiving energy or a maximum preamble correlation detection output value, transmits one RAR containing one TA and Msg3 resource configuration information. The UE detects in one RAR detecting window, detects one TA and Msg3 resource configuration information, and transmits one Msg3 according to the detected TA and Msg3 resource configuration information.

3.3 The base station detects preamble transmissions on multiple PRACHs, and/or, detects multiple same or different preamble transmissions on one PRACH, the base station selects all or some of the detected preamble transmissions, transmits one RAR containing multiple TAs and Msg3 resource configuration information. The UE detects in one RAR detecting window and detects one or more TAs and Msg3 resource configuration information, selects one TA and Msg3 resource configuration information, and transmits one Msg3 according to the selected TA and Msg3 resource configuration information.

3.4 The base station detects preamble transmissions on multiple PRACHs, and/or, detects multiple same or different preamble transmissions on one PRACH, the base station sorts all or some of the beam directions in which the preamble is detected according to preamble correlation detection output values, and assigns an index representing a ranked position for corresponding TA and Msg3 resource configuration information in turn. Based on the sorted result, the base station selects all or some of the detected preamble transmissions, and transmits one RAR containing multiple TAs, Msg3 resource configuration information and corresponding indexes. The UE detects in one RAR detecting window and detects one or more TAs and Msg3 resource configuration information and the corresponding indexes. The UE selects one TA and Msg3 resource configuration information based on the indexes, and transmits one Msg3.

3.5 The UE predefines a maximum number for the TA and Msg3 resource configuration information. The base station detects one preamble transmission on one PRACH, and transmits one RAR containing one TA and Msg3 resource configuration information. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects one TA and Msg3 resource configuration information, the UE transmits one Msg3 according to the detected TA and Msg3 resource configuration information.

3.6 The UE predefines a maximum number for the TA and Msg3 resource configuration information. The base station detects preamble transmissions on multiple PRACHs, and/or, detects multiple same or different preamble transmission on one PRACH, selects a preamble transmission with the highest receiving energy or maximum preamble correlation detection output value, and transmits one RAR containing one TA and Msg3 resource configuration information. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects one TA and Msg3 resource configuration information, the UE transmits one Msg3 according to the detected TA and Msg3 resource configuration information.

3.7 The UE predefines a maximum number for the TA and Msg3 resource configuration information. The base station detects preamble transmissions on multiple PRACHs, and/or, detects multiple same or different preamble transmissions on one PRACH. The base station selects all or some of detected preamble transmissions, and transmits one RAR containing multiple TAs and Msg3 resource configuration information. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects one or more TAs and Msg3 resource configuration information, the UE select one TA and Msg3 resource configuration information, and transmits one Msg3 according to the selected TA and Msg3 resource configuration information.

3.8 The UE predefines a maximum number for the TA and Msg3 resource configuration information. The base station detects preamble transmissions on multiple PRACHs, and/or, detects multiple same or different preamble transmissions on one PRACH. The base station sorts all or some beam directions in which preamble is detected in a descending order of preamble correlation detection output values, and respectively assigns an index representing a ranked position for corresponding TA and Msg3 resource configuration information in turn. Based on the sorted result, the base station selects all or some of detected preamble transmissions, and transmits one RAR containing multiple TAs and Msg3 resource configuration information and corresponding indexes. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects one or more TAs and Msg3 resource configuration information and the corresponding indexes, the UE select one TA and Msg3 resource configuration information based on the indexes, and transmits one Msg3.

The above manners 3.1 to 3.8 may be as shown in FIG. 16.

4.1 The base station detects preamble transmissions on multiple PRACHs, and/or, detects multiple same or different preamble transmissions on one PRACH, the base station selects all or some of the detected preamble transmissions, transmits one RAR containing multiple TAs and Msg3 resource configuration information. The UE detects in one RAR detecting window, detects multiple TAs and Msg3 resource configuration information, selects all or some of the TAs and Msg3 resource configuration information, and transmits one Msg3 respectively according to each selected TA and Msg3 resource configuration information.

4.2 The base station detects preamble transmissions on multiple PRACHs, and/or, detects multiple same or different preamble transmissions on one PRACH. The base station sorts all or some beam directions in which preamble is detected in a descending order of preamble correlation detection output values, and respectively assigns an index representing a ranked position for corresponding TA and Msg3 resource configuration information in turn. Based on the sorted result, the base station selects all or some of detected preamble transmissions, and transmits one RAR containing multiple TAs and Msg3 resource configuration information and corresponding indexes. The UE detects in one RAR detecting window and detects multiple TAs and Msg3 resource configuration information and the corresponding indexes, select all or some of the TAs and Msg3 resource configuration information based on the indexes, and transmits a Msg3 respectively according to each selected TA and Msg3 resource configuration information.

4.3 The UE predefines a maximum number for the TA and Msg3 resource configuration information. The base station detects preamble transmissions on multiple PRACHs, and/or, detects multiple same or different preamble transmissions on one PRACH. The base station selects all or some of the detected preamble transmissions, and transmits one RAR containing multiple TAs and Msg3 resource configuration information. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects multiple TAs and Msg3 resource configuration information, the UE selects all or some of the detected TA and Msg3 resource configuration information, and transmits one Msg3 respectively according to each selected TA and Msg3 resource configuration information.

4.4 The UE predefines a maximum number for the TA and Msg3 resource configuration information. The base station detects preamble transmissions on multiple PRACHs, and/or, detects multiple same or different preamble transmissions on one PRACH. The base station sorts all or some beam directions in which preamble is received according to a descending order of preamble correlation detection output values, respectively assigns an index representing a ranked position for respective TA and Msg3 resource configuration information in turn. Based on the sorted result, the base station selects all or some of the preamble transmissions, transmits one RAR containing multiple TAs and Msg3 resource configuration information and corresponding indexes. The UE detects in one RAR detecting window, after the UE detects the maximum number of TAs and Msg3 resource configuration information, or the UE fails to detect the maximum number of TAs and Msg3 resource configuration information after detecting all TAs and Msg3 resource configuration information, the UE stops the RAR detection procedure. If the UE detects multiple TAs and Msg3 resource configuration information and the corresponding indexes, the UE selects all or some of the detected TAs and Msg3 resource configuration information based on the indexes, and transmits one Msg3 respectively according to each selected TA and Msg3 resource configuration information.

The above manners 4.1 to 4.4 may be as shown in FIG. 17.

If the base station detects a preamble in a second preamble group on one or more PRACHs of the PRACH resource set, the base station calculates the RA-RNTI according to the time-frequency resources of the PRACH on which the preamble is detected, and scrambles the downlink control channel corresponding to different RAR detecting windows using the RA-RNTI. In particular, the following manners may be adopted.

5.1 The base station detects one preamble transmission on one PRACH, and transmits one RAR containing one TA and Msg3 resource configuration information. The UE detects in multiple RAR detecting windows, detects one RAR and the RAR contains merely one TA and Msg3 resource configuration information. The UE transmits one Msg3 according to the detected TA and Msg3 resource configuration information.

5.2 The base station detects preamble transmissions on multiple PRACHs, and/or, detects multiple same or different preamble transmissions on one PRACH, the base station selects one preamble transmission with the highest receiving energy or the maximum preamble correlation detection output value, and transmits one RAR containing multiple TAs and Msg3 resource configuration information. The UE detects in multiple RAR detecting windows, and detects one RAR containing merely one TA and Msg3 resource configuration information. The UE transmits one Msg3 according to the detected TA and Msg3 resource configuration information.

5.3 The base station detects preamble transmissions on multiple PRACHs, and/or, detects multiple same or different preamble transmissions on one PRACH, the base station selects all or some of the detected preamble transmissions, and transmits one RAR containing multiple TAs and Msg3 resource configuration information. The UE detects in multiple RAR detecting windows, and detects multiple RARs, or detects one RAR containing multiple TAs and Msg3 resource configuration information. The UE selects one TA and Msg3 resource configuration information and transmits one Msg3.

5.4 The base station detects preamble transmissions on multiple PRACHs, and/or, detects multiple same or different preamble transmissions on one PRACH. The base station sorts all or some beam directions in which the preamble is detected according to a descending order of preamble correlation detecting output values, and respectively assigns an index representing the ranked position for respective TA and Msg3 resource configuration information in turn. Based on the sorted result, the base station selects all or some of the detected preamble transmissions, and transmits one RAR containing multiple TAs and Msg3 resource configuration information and corresponding indexes or transmits multiple RARs respectively containing an index. The UE detects in multiple RAR detecting windows, detects multiple RARs respectively containing the index, or detects one RAR containing one or more TAs, Msg3 resource configuration information, and the indexes. The UE selects one TA and Msg3 resource configuration information based on the indexes, and transmits one Msg3.

5.5 The UE predefines a maximum number for the RAR or for the TA and the Msg3 resource configuration information. The base station detects one preamble transmission on one PRACH, and transmits one RAR containing one TA and Msg3 resource configuration information. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects one RAR, and the RAR contains one TA and Msg3 resource configuration information, the UE transmits one Msg3 according to the detected TA and Msg3 resource configuration information.

5.6 The UE predefines a maximum number for the RAR or for the TA and the Msg3 resource configuration information. The base station detects preamble transmissions on multiple PRACHs, and/or, detects multiple same or different preamble transmission on one PRACH, the base station selects the preamble transmission with the highest receiving energy or the maximum preamble correlation detection output value, and transmits one RAR containing one TA and Msg3 resource configuration information. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects one RAR and the RAR contains one TA and Msg3 resource configuration information, the UE transmits one Msg3 according to the detected TA and Msg3 resource configuration information.

5.7 The UE predefines a maximum number for the RAR or for the TA and the Msg3 resource configuration information. The base station detects preamble transmissions on multiple PRACHs, and/or, detects multiple same or different preamble transmission on one PRACH, the base station selects all or some of the detected preamble transmissions, and transmits one RAR containing multiple TAs and Msg3 resource configuration information or transmits multiple RARs. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects multiple RARs, or detects one RAR and the RAR contains multiple TAs and Msg3 resource configuration information, the UE selects one TA and Msg3 resource configuration information, and transmits one Msg3.

5.8 The UE predefines a maximum number for the RAR or for the TA and the Msg3 resource configuration information. The base station detects preamble transmissions on multiple PRACHs, and/or, detects multiple same or different preamble transmission on one PRACH, the base station sorts all or some beam directions in which the preamble is detected according to a descending order of preamble correlation detecting output values, and respectively assigns an index representing the ranked position for respective TA and Msg3 resource configuration information in turn. Based on the sorted result, the base station selects all or some of the detected preamble transmissions, and transmits one RAR containing multiple TAs and Msg3 resource configuration information and corresponding indexes or transmits multiple RARs respectively containing an index. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects multiple RARs respectively containing the index, or detects one RAR containing one or more TAs, Msg3 resource configuration information and the indexes. The UE selects one TA and Msg3 resource configuration information based on the indexes, and transmits one Msg3.

The above manners 5.1 to 5.8 may be as shown in FIG. 18.

6.1 The base station detects preamble transmissions on multiple PRACHs, and/or, detects multiple same or different preamble transmissions on one PRACH. The base station selects all or some of the detected preamble transmissions, and transmits one RAR containing multiple TAs and Msg3 resource configuration information or transmits multiple RARs. The UE detects in multiple RAR detecting windows, and detects multiple RARs or detects one RAR containing multiple TAs and Msg3 resource configuration information, the UE selects all or some of the detected TAs and Msg3 resource configuration information, and respectively transmits one Msg3 according to each selected TA and Msg3 resource configuration information.

6.2 The base station detects preamble transmissions on multiple PRACHs, and/or, detects multiple same or different preamble transmissions on one PRACH. The base station sorts all or some beam directions in which the preamble is detected according to a descending order of preamble correlation detecting output values, and respectively assigns an index representing the ranked position for respective TA and Msg3 resource configuration information in turn. Based on the sorted result, the base station selects all or some of the detected preamble transmissions, and transmits one RAR containing multiple TAs and Msg3 resource configuration information or transmits multiple RARs. The UE detects in multiple RAR detecting windows, detects multiple RARs respectively containing an index, or detects one RAR containing one or more TAs, Msg3 resource configuration information, and the indexes. The UE selects all or some TAs and Msg3 resource configuration information based on the indexes, and respectively transmits one Msg3 according to each selected TA and Msg3 resource configuration information.

6.3 The UE predefines a maximum number for the RAR or for the TA and the Msg3 resource configuration information. The base station detects preamble transmissions on multiple PRACHs, and/or, detects multiple same or different preamble transmissions on one PRACH. The base station selects all or some of the detected preamble transmissions. The base station transmits one RAR containing multiple TAs and Msg3 resource configuration information or transmits multiple RARs. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects multiple RARs, or detects one RAR and the RAR contains one or more TAs and Msg3 resource configuration information, the UE selects all or some TAs and Msg3 resource configuration information, and respectively transmits one Msg3 according to each selected TA and Msg3 resource configuration information.

6.4 The UE predefines a maximum number for the RAR or for the TA and the Msg3 resource configuration information. The base station detects preamble transmissions on multiple PRACHs, and/or, detects multiple same or different preamble transmissions on one PRACH, the base station sorts all or some beam directions in which the preamble is detected according to a descending order of preamble correlation detecting output values, and respectively assigns an index representing the ranked position for respective TA and Msg3 resource configuration information in turn. Based on the sorted result, the base station selects all or some of the detected preamble transmissions, and transmits one RAR containing multiple TAs and Msg3 resource configuration information or transmits multiple RARs. The UE detects in multiple RAR detecting windows. After the UE detects the maximum number of RARs or the maximum number of TAs and Msg3 resource configuration information, or after the UE fails to detect the maximum number of RARs or the maximum number of TAs and Msg3 resource configuration information after detecting in all RAR detecting windows, the UE stops the RAR detection procedure. If the UE detects multiple RARs respectively containing an index, or detects one RAR containing one or more TAs, Msg3 resource configuration information, and corresponding indexes. The UE selects all or some TAs and Msg3 resource configuration information based on the indexes, and respectively transmits one Msg3 according to each selected TA and Msg3 resource configuration information.

The above manners 6.1 to 6.4 may be as shown in FIG. 19.

In accordance with the above method, some embodiments of the present disclosure further provide a UE. The structure of the UE (10) is as shown in FIG. 20, including: a response detecting module (2010) and a Msg3 transmitting module (2020); wherein the response detecting module (2010) is configured to detect a RAR; and the Msg3 transmitting module (2020) is configured to transmit at least one Msg3 adopting a method corresponding to a beam reciprocity capability of the UE.

FIG. 21 is a schematic diagram illustrating an inner structure of a terminal according to an embodiment of the present disclosure.

Referring to FIG. 21, a terminal (i.e. UE, 10) includes a transceiver (2120), a controller (2110), and a memory (2130).

The controller (2110) or the transceiver (2120) comprises at least one of the response detecting module (2010) or the Msg3 transmitting module (2020).

The controller (2110) controls the overall operation of the terminal (10). More particularly, the controller (2110) controls the terminal (10) to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 20, and a description thereof will be omitted herein.

The transceiver (2120) transmits various signals, various messages, and the like to other entity, e.g., a base station (20), and the like under a control of the controller (2110). The various signals, the various messages, and the like transmitted in the transceiver (2120) have been described in FIGS. 1 to 20, and a description thereof will be omitted herein.

The transceiver (2120) receives various signals, various messages, and the like from other entity, e.g., a base station, and the like under a control of the controller (2110). The various signals, the various messages and the like received in the transceiver (2120) have been described in FIGS. 1 to 20, and a description thereof will be omitted herein.

The memory (2130) stores a program and various data necessary for the operation of the terminal (10), information related to the operation of transmitting/receiving the signal based on the cooperative transmission scheme in the wireless communication system supporting the distributed antenna system according to an embodiment of the present disclosure, and the like. The memory (2130) stores the various signals, the various messages, and the like received in the transceiver (2120).

While the controller (2110), the transceiver (2120), and the memory (2130) are described as separate units, it is to be understood that this is merely for convenience of description. In other words, two or more of the controller (2110), the transceiver (2120), and the memory (2130) may be incorporated into a single unit. The terminal (10) may be implemented with one processor as the controller.

FIG. 22 is a schematic diagram illustrating an inner structure of a base station (20) according to an embodiment of the present disclosure.

Referring to FIG. 22, a base station (20) includes a controller (2210), a transceiver (2220), and a memory (2230).

The controller (2210) controls the overall operation of the base station (1000). More particularly, the controller (2210) controls the base station (20) to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 20, and a description thereof will be omitted herein.

The transceiver (2220) transmits various signals, various messages, and the like to other entity, e.g., a terminal, and the like under a control of the controller (2210). The various signals, the various messages, and the like transmitted in the transceiver (2220) have been described in FIGS. 1 to 20, and a description thereof will be omitted herein.

The transceiver (2220) receives various signals, various messages, and the like from other entity, e.g., a terminal, and the like under a control of the controller (2210). The various signals, the various messages and the like received in the transceiver (2220) have been described in FIGS. 1 to 20, and a description thereof will be omitted herein.

The memory (2230) stores a program and various data necessary for the operation of the base station (20), information related to the operation of transmitting/receiving the signal based on the cooperative transmission scheme in the wireless communication system supporting the distributed antenna system according to an embodiment of the present disclosure, and the like. The memory (2230) stores the various signals, the various messages, and the like received in the transceiver (2220).

While the controller (2210), the transceiver (2220), and the memory (2230) are described as separate units, it is to be understood that this is merely for convenience of description. In other words, two or more of the controller (2210), the transceiver (2220), and the memory (2230) may be incorporated into a single unit. The base station (20) may be implemented with one processor as the controller.

Those with ordinary skill in the art would know that, the present disclosure includes one or more devices for executing the operations in the present disclosure. These devices may be specially designed and produced for required purposes or may be known devices included in general purpose computers. These devices include computer programs stored in the devices. The programs are selectively activated or reconstructed. The computer programs may be stored in the machine (e.g. computer) readable storage medium, the machine readable storage medium includes but is not limited to any disk (such as floppy disk, hard disk, compact disk, CD-ROM, and magnetic compact disk), ROM (read-only memory), RAM (random access memory), EEPROM (erasable programmable read only memory), EEPROM (electrically erasable programmable read-only memory), flash disk, magnetic card or optical card. In other words, the machine readable storage medium includes any medium storing information readable by the machine (e.g. computer).

Those with ordinary skill in the art would know that, each block in the diagram and/or flowchart and combinations of the blocks in the diagram and/or flowchart may be implemented via computer program instructions. Those with ordinary skill in the art would know that these computer program instructions may be provided to general purpose computers, dedicated computers or other programmable data processors to implement the solutions provided by the blocks in the diagrams and/or flowcharts of the present disclosure.

Those with ordinary skill in the art would know that, the steps, manners and solutions in various operations, method, procedures of the present disclosure may be replaced, modified, combined or deleted. Furthermore, other steps, manners and solutions associated with various operations, methods and procedures of the present disclosure may also be replaced, modified, rearranged, divided, combined or deleted. In addition, steps, manners and solutions in the prior art associated with various operations, methods, procedures of the present disclosure may also be replaced, modified, rearranged, divided, combined, or deleted.

The foregoing are only preferred embodiments of the present disclosure and are not for use in limiting the protection scope of the present disclosure. Any modification, equivalent replacement and improvement made within the scope of the present disclosure should be covered under the protection scope of the present disclosure.

The invention claimed is:
1. A method for performing a random access by a user equipment (UE), the method comprising:
 receiving, from a base station (BS), a random access response (RAR); and
 transmitting, to the BS, at least one Msg3 according to a beam reciprocity capability of the UE,
 wherein the UE with the beam reciprocity capability transmits a preamble on a physical random access channel (PRACH) within first type PRACH resources, and the UE without the beam reciprocity capability transmits same or different preambles on PRACHs within second type PRACH resources using beam switching or beam polling.
2. The method of claim 1,
 wherein transmitting the at least one Msg3 comprises:
  transmitting the at least one Msg3 according to the beam reciprocity capability of the UE and Msg3 transmission configuration information in the RAR, and
 wherein the Msg3 transmission configuration information includes timing advance (TA) and Msg3 resource configuration information.
3. The method of claim 2,
 wherein time-frequency positions of the first type PRACH resources and time-frequency positions of the second type PRACH resources are different, and wherein a preamble resource pool corresponding to the first type PRACH resources and a preamble resource pool corresponding to the second type PRACH resources are different, or partially different, or the same.

4. The method of claim 3,
wherein receiving the RAR comprises: for the UE with the beam reciprocity capability,
  monitoring a downlink control channel in a RAR detecting window using a random access-radio network temporary identifier (RA-RNTI) corresponding to a PRACH on which the preamble is transmitted, if downlink control information scrambled by the corresponding RA-RNTI is detected on the downlink control channel, reading a RAR on a downlink shared channel indicated by the downlink control information, and obtaining the TA and the Msg3 resource configuration information in the RAR, and
wherein transmitting the at least one Msg3 comprises at least one of:
  if the RAR includes one TA and Msg3 resource configuration information, transmitting one Msg3 according to the detected TA and the Msg3 resource configuration information;
  if the RAR includes at least two TAs and Msg3 resource configuration information, selecting according to a predefined rule or randomly selecting at least one TA and Msg3 resource configuration information, and transmitting one Msg3 respectively according to each selected TA and Msg3 resource configuration information; or
  if the RAR includes at least two TAs and the Msg3 resource configuration information, respectively transmitting one Msg3 according to each detected TA and Msg3 resource configuration information.

5. The method of claim 3,
wherein receiving the RAR comprises: for the UE without the beam reciprocity capability,
  if a base station configures one RAR detecting window, monitoring the downlink control channel in the RAR detecting window simultaneously using RA-RNTIs corresponding to PRACHs on which the preamble is transmitted, if successfully decoding in the RAR detecting window according to at least one RA-RNTI, reading downlink resource allocation allocated by the corresponding control channel, and if detecting an identifier of the transmitted preamble on the downlink resource allocation corresponding to the at least one RA-RNTI, determining that the RAR detection succeeds, and
wherein transmitting the at least one Msg3 comprises at least one of:
  if the UE detects one TA and Msg3 resource configuration information, transmitting one Msg3 according to the detected TA and the Msg3 resource configuration information;
  if the UE detects at least two TAs and Msg3 resource configuration information, selecting according to a predefined rule or randomly selecting at least one TA and Msg3 resource configuration information, and transmitting one Msg3 respectively according to each selected TA and Msg3 resource configuration information;
  if the UE detects at least two TAs and Msg3 resource configuration information, respectively transmitting one Msg3 according to each detected TA and Msg3 resource configuration information;
  predefining a maximum number for the TA and the Msg3 resource configuration information, after the UE detects the maximum number of TAs and the Msg3 resource configuration information, or after the UE has detected all TA and the Msg3 resource configuration information but does not detect the maximum number of TAs and Msg3 resource configuration information, stopping the RAR detection, and if one TA and Msg3 resource configuration information is detected, transmitting one Msg3 according to the detected TA and the Msg3 resource configuration information;
  predefining a maximum number for the TA and the Msg3 resource configuration information, after the UE detects the maximum number of TAs and the Msg3 resource configuration information, or after the UE has detected all TAs and the Msg3 resource configuration information but does not detect the maximum number of TAs and Msg3 resource configuration information, stopping the RAR detection, if at least two TAs and the Msg3 resource configuration information are detected, selecting according to a predefined rule or randomly selecting at least one TA and Msg3 resource configuration information, and respectively transmitting one Msg3 according to each selected TA and Msg3 resource configuration information; or
  predefining a maximum number for the TA and the Msg3 resource configuration information, after the UE detects the maximum number of TAs and the Msg3 resource configuration information, or after the UE has detected all TA and the Msg3 resource configuration information but does not detect the maximum number of TAs and Msg3 resource configuration information, stopping the RAR detection, and if at least two TAs and Msg3 resource configuration information are detected, respectively transmitting one Msg3 according to each detected TA and Msg3 resource configuration information.

6. The method of claim 3,
wherein receiving the RAR comprises: for the UE without the beam reciprocity capability, if the base station configures at least two RAR detecting windows and allocates PRACHs, monitoring RAR detecting windows; and
wherein transmitting the at least one Msg3 comprises at least one of:
  if the UE detects one RAR in all RAR detecting windows, and the RAR includes one TA and Msg3 resource configuration information, transmitting one Msg3 according to the detected TA and Msg3 resource configuration information;
  if the UE detects, in all RAR detecting windows, at least two RARs or one RAR containing at least two TAs and Msg3 resource configuration information, selecting according to a predefined rule or randomly selecting at least one TA and Msg3 resource configuration information of at least one RAR, and respectively transmitting one Msg3 according to each selected TA and Msg3 resource configuration information;
  if the UE detects, in all RAR detecting windows, at least two RARs or one RAR containing at least two TAs and Msg3 resource configuration information, respectively transmitting one Msg3 according to each TA and Msg3 resource configuration information in the detected RAR;

predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection, and if one RAR is detected, and the RAR contains one TA and Msg3 resource configuration information, transmitting one Msg3 according to the detected TA and Msg3 resource configuration information;

predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if at least two RARs are detected, or one RAR is detected and the RAR contains at least two TAs and Msg3 resource configuration information are detected, selecting according to a predefined rule or randomly selecting at least one TA and Msg3 resource configuration information in at least one RAR, and respectively transmitting one Msg3 according to each selected TA and Msg3 resource configuration information; or predefining a maximum number for the RAR or for the TA and Msg3 resource configuration information, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection, and if at least two RARs are detected, or one RAR is detected and the RAR contains at least two TAs and Msg3 resource configuration information are detected, respectively transmitting one Msg3 according to each TA and Msg3 resource configuration information in respective detected RAR.

7. The method of claim 2, further comprising:
for the UE with the beam reciprocity capability, selecting a PRACH in a PRACH resource set according to configuration information of a base station or selecting a PRACH with equal probability from all available PRACHs to transmit a preamble in a first type preamble resource pool, or for the UE with the beam reciprocity capability, transmitting a preamble of the first type preamble resource pool using the same beam on PRACHs within one PRACH resource set; and
for the UE without the beam reciprocity capability, transmitting a preamble in a second type preamble resource pool using different beam directions on different PRACHs according to the number of transmission beams supported by the UE without the beam reciprocity capability,
wherein each PRACH resource set includes at least two PRACHs, the first type preamble resource pool and the second type preamble pool are different.

8. The method of claim 7, wherein if the UE detect in one RAR detecting window, transmitting the at least one Msg3 comprises at least one of:
if the UE detects in the RAR detecting window and detects one TA and Msg3 resource configuration information, transmitting one Msg3 according to the detected TA and Msg3 resource configuration information;
if the UE detects in the RAR detecting window and detects at least one TA and Msg3 resource configuration information, selecting one TA and Msg3 resource configuration information, and transmitting one Msg3 according to the selected TA and Msg3 resource configuration information;
if the UE detects in the RAR detecting window and detects at least one TA and Msg3 resource configuration information and a corresponding ranked position index, selecting one TA and Msg3 resource configuration information according to the ranked position index, and transmitting one Msg3 according to the selected TA and Msg3 resource configuration information;
if the UE detects in one RAR detecting window and detects at least one TA and Msg3 resource configuration information, selecting all or some of the TAs and Msg3 resource information, and respectively transmitting one Msg3 according to each selected TA and Msg3 resource configuration information;
if the UE detects in one RAR detecting window and detects at least one TA and Msg3 resource configuration information and a corresponding ranked position index, selecting all or some of the TAs and Msg3 resource configuration information according to the ranked position index, and respectively transmitting one Msg3 according to each selected TA and Msg3 resource configuration information;
predefining a maximum number for the TA and Msg3 resource configuration information, detecting in one RAR detecting window, after the UE detects the maximum number of TAs and Msg3 resource configuration information, or after the UE has detected all TAs and Msg3 resource configuration but fails to detect the maximum number of TAs and Msg3 resource configuration information, stopping the RAR detection; if one TA and Msg3 resource configuration information is detected, transmitting one Msg3 according to the detected TA and Msg3 resource configuration information;
predefining a maximum number for the TA and Msg3 resource configuration information, detecting in one RAR detecting window, after the UE detects the maximum number of TAs and Msg3 resource configuration information, or after the UE has detected all TAs and Msg3 resource configuration but fails to detect the maximum number of TAs and Msg3 resource configuration information, stopping the RAR detection; if at least one TA and Msg3 resource configuration information is detected, selecting one TA and Msg3 resource configuration information, and transmitting one Msg3 according to the selected TA and Msg3 resource configuration information; or
predefining a maximum number for the TA and Msg3 resource configuration information, detecting in one RAR detecting window, after the UE detects the maximum number of TAs and Msg3 resource configuration information, or after the UE has detected all TAs and Msg3 resource configuration but fails to detect the maximum number of TAs and Msg3 resource configuration information, stopping the RAR detection; if one or more TAs and Msg3 resource configuration information and a corresponding ranked position index is detected, selecting one TA and Msg3 resource configuration information based on the ranked position index, and transmitting one Msg3.

9. The method of claim 7, wherein if the UE detects in at least two RAR detecting windows, transmitting the at least one Msg3 comprises at least one of:

predefining a maximum number for the TA and the Msg3 resource configuration information, after the UE detects the maximum number of TAs and Msg3 resource configuration information, or after the UE has detected all TAs and Msg3 resource configuration but fails to detect the maximum number of TAs and Msg3 resource configuration information, stopping the RAR detection; if at least two TAs and Msg3 resource configuration information are detected, selecting all or some of the detected TAs and Msg3 resource configuration information, and respectively transmitting one Msg3 according to each selected TA and Msg3 resource configuration information;

predefining a maximum number for the TA and the Msg3 resource configuration information, after the UE detects the maximum number of TAs and Msg3 resource configuration information, or after the UE has detected all TAs and Msg3 resource configuration but fails to detect the maximum number of TAs and Msg3 resource configuration information, stopping the RAR detection; if multiple TAs and Msg3 resource configuration information and corresponding ranked position indexes are detected, selecting all or some of the TAs and Msg3 resource configuration information based on the ranked position indexes, and respectively transmitting one Msg3 according to each selected TA and Msg3 resource configuration information;

the UE detecting in at least two RAR detecting windows, if one RAR is detected, and the RAR contains one TA and Msg3 resource configuration information, transmitting one Msg3 according to the detected TA and Msg3 resource configuration information;

the UE detecting in at least two RAR detecting windows, if the UE detects at least two RARs, or detects one RAR containing at least one TA and Msg3 resource configuration information, selecting one TA and Msg3 resource configuration information, and transmitting one Msg3;

the UE detecting in at least two RAR detecting windows, if the UE detects at least two RARs respectively containing a ranked position index, or detects one RAR containing at least one TA, Msg3 resource configuration information and a ranked position index, selecting one TA and Msg3 resource configuration information according to the ranked position index, and transmitting one Msg3;

predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if one RAR is detected and the RAR contains one TA and Msg3 resource configuration information, transmitting one Msg3 according to the detected TA and Msg3 resource configuration information;

predefining a maximum number for the RAR or for the TA and the Msg3 resource configuration information, the UE detecting in at least two RAR detecting windows, after the UE detects the maximum number RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if at least two RARs are detected, or one RAR containing at least one TA and Msg3 resource configuration information is detected, selecting one TA and Msg3 resource configuration information, and transmitting one Msg3;

predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs respectively containing a ranked position index, or detects one RAR containing at least one TA and Msg3 resource configuration information and a ranked position index, selecting one TA and Msg3 resource configuration information based on the ranked position index, and transmitting one Msg3;

the UE detecting in at least two RAR detecting windows, if the UE detects at least two RARs, or detects one RAR containing at least one TA and Msg3 resource configuration information, selecting all or some of the detected TAs and Msg3 resource configuration information, and respectively transmitting one Msg3 according to each selected TA and Msg3 resource configuration information;

the UE detecting in at least two RAR detecting windows, if the UE detects at least two RARs respectively containing a ranked position index, or detects one RAR containing at least one TA and Msg3 resource configuration information and a ranked position index, selecting all or some of the TAs and the Msg3 resource configuration information based on the ranked position index, and respectively transmitting one Msg3 according to each selected TA and Msg3 resource configuration information;

predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs, or detects one RAR containing at least one TA and Msg3 resource configuration information, selecting all or some of the TAs and Msg3 resource configuration information, and respectively transmitting one Msg3 according to each selected TA and Msg3 resource configuration information; or predefining a maximum number for the RAR or for the TA and the Msg3 resource configuration information, the UE detecting in at least two RAR detecting windows, after the UE detects the maximum number of RARs or the maximum number of TAs and Msg3 resource configuration information, or after the UE has detected in all RAR detecting windows but fails to detect the maximum number of RARs or the maximum number of TAs and Msg3 resource configuration information, stopping the RAR detection; if the UE detects at least two RARs respectively containing a ranked position index, or detects one RAR containing one or more TAs and Msg3 resource configuration information and a ranked position index, selecting all or some of the TAs and the Msg3 resource configuration information according to the ranked position index, and respectively transmitting one Msg3 according to each selected TA and Msg3 resource configuration information.

10. A user equipment (UE) for performing a random access, the UE comprising:
a transceiver; and
a controller coupled with the transceiver and configured to control to:
receive, from a base station (BS), a random access response (RAR), and
transmit, to the BS, at least one Msg3 corresponding to a beam reciprocity capability of the UE,
wherein the controller is further configured to control to transmit a preamble on a physical random access channel (PRACH) within first type PRACH resources for the UE with the beam reciprocity capability, and
wherein the controller is further configured to control to transmit same or different preambles on PRACHs within second type PRACH resources using beam switching or beam polling for the UE without the beam reciprocity capability.

11. The UE of claim 10,
wherein the controller is further configured to control to transmit the at least one Msg3 according to the beam reciprocity capability of the UE and Msg3 transmission configuration information in the RAR, and
wherein the Msg3 transmission configuration information includes timing advance (TA) and Msg3 resource configuration information.

12. The UE of claim 11,
wherein for the UE with the beam reciprocity capability, the controller is further configured to control to select a PRACH in a PRACH resource set according to configuration information of a base station or select a PRACH with equal probability from all available PRACHs to transmit a preamble in a first type preamble resource pool, or for the UE with the beam reciprocity capability, transmit a preamble of the first type preamble resource pool using the same beam on PRACHs within one PRACH resource set,
wherein for the UE without the beam reciprocity capability, the controller is further configured to control to transmit a preamble in a second type preamble resource pool using different beam directions on different PRACHs according to the number of transmission beams supported by the UE without the beam reciprocity capability, and
wherein each PRACH resource set includes at least two PRACHs, the first type preamble resource pool and the second type preamble pool are different from each other.

13. The UE of claim 10, wherein time-frequency positions of the first type PRACH resources and time-frequency positions of the second type PRACH resources are different from each other.

14. The UE of claim 10, wherein a preamble resource pool corresponding to the first type PRACH resources and a preamble resource pool corresponding to the second type PRACH resources are different, or partially different, or same from each other.

15. A method for proving a random access by a base station (BS), the method comprising:
transmitting, to a user equipment (UE), a random access response (RAR); and
receiving, from the UE, at least one Msg3 corresponding to a beam reciprocity capability of the UE,
wherein the BS receives, from the UE with the beam reciprocity capability, a preamble on a physical random access channel (PRACH) within first type PRACH resources for the UE with the beam reciprocity capability, and
wherein the BS receives, from the UE without the beam reciprocity capability, same or different preambles on PRACHs within second type PRACH resources using beam switching or beam polling for the UE without the beam reciprocity capability.

16. A base station (BS) for proving a random access, the BS comprising:
a transceiver; and
a controller coupled with the transceiver and configured to control to:
control the transceiver to transmit, to a user equipment (UE), a random access response (RAR), and
receive, from the UE, at least one Msg3 corresponding to a beam reciprocity capability of the UE,
wherein the controller is further configured to control to receive, from the UE with the beam reciprocity capability, a preamble on a physical random access channel (PRACH) within first type PRACH resources for the UE with the beam reciprocity capability, and
wherein the controller is further configured to control to receive, from the UE without the beam reciprocity capability, same or different preambles on PRACHs within second type PRACH resources using beam switching or beam polling for the UE without the beam reciprocity capability.

17. The BS of claim 16,
wherein the controller is configured to control to receive the at least one Msg3 according to the beam reciprocity capability of the UE and Msg3 transmission configuration information in the RAR; and
wherein the Msg3 transmission configuration information includes timing advance (TA) and Msg3 resource configuration information.

18. The BS of claim 17, wherein time-frequency positions of the first type PRACH resources and time-frequency positions of the second type PRACH resources are different from each other.

* * * * *